US012804650B2

(12) United States Patent
Li et al.

(10) Patent No.: US 12,804,650 B2
(45) Date of Patent: Nov. 17, 2026

(54) VALID PDSCHs OR PUSCHs WITH MULTIPLE PDSCH OR PUSCH SCHEDULING

(71) Applicant: Intel Corporation, Santa Clara, CA (US)

(72) Inventors: Yingyang Li, Santa Clara, CA (US); Gang Xiong, Portland, OR (US); Daewon Lee, Portland, OR (US); Yi Wang, Santa Clara, CA (US)

(73) Assignee: Intel Products IP LLC, Santa Clara, CA (US)

( * ) Notice: Subject to any disclaimer, the term of this patent is extended or adjusted under 35 U.S.C. 154(b) by 364 days.

(21) Appl. No.: 18/560,001

(22) PCT Filed: Jan. 20, 2023

(86) PCT No.: PCT/US2023/011281
§ 371 (c)(1),
(2) Date: Nov. 9, 2023

(87) PCT Pub. No.: WO2023/141298
PCT Pub. Date: Jul. 27, 2023

(65) Prior Publication Data

US 2024/0236990 A1 Jul. 11, 2024

Related U.S. Application Data

(60) Provisional application No. 63/307,520, filed on Feb. 7, 2022, provisional application No. 63/301,888, filed on Jan. 21, 2022.

(51) Int. Cl.
*H04W 72/1273* (2023.01)
*H04L 5/00* (2006.01)
*H04W 72/232* (2023.01)

(52) U.S. Cl.
CPC ....... *H04W 72/1273* (2013.01); *H04L 5/0094* (2013.01); *H04W 72/232* (2023.01)

(58) Field of Classification Search
CPC ... H04L 5/0044; H04L 5/0053; H04L 5/0094; H04L 5/14; H04W 72/1273; H04W 72/232; H04W 72/23
(Continued)

(56) References Cited

U.S. PATENT DOCUMENTS

2019/0141693 A1* 5/2019 Guo ...................... H04L 5/0053
2019/0297640 A1* 9/2019 Liou ...................... H04L 5/001
(Continued)

FOREIGN PATENT DOCUMENTS

WO 2021/028414 A1 2/2021

OTHER PUBLICATIONS

ETSI 138 214 v16.7.0 “5G; NR; Physical layer procedures for data (3GPP TS 38.214 version 16.7.0 Release 16”; Oct. 2021). (Year: 2021).*
(Continued)

*Primary Examiner* — Stephen J Clawson
(74) *Attorney, Agent, or Firm* — Gray Ice Higdon, PLLC

(57) ABSTRACT

Various embodiments herein provide techniques to determine valid and invalid physical downlink shared channels (PDSCHs) and/or physical uplink shared channels (PUSCHs) with multi-PDSCH and/or PUSCH scheduling. Embodiments further relate to determination of transmission configuration indicator (TCI) state and/or quasi co-location (QCL) for multi-PDSCH and/or PUSCH scheduling. Other embodiments may be described and claimed.

14 Claims, 11 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2020/0336193 | A1* | 10/2020 | Park | H04W 76/27 |
| 2020/0351934 | A1* | 11/2020 | Khoshnevisan | H04L 5/0053 |
| 2021/0112583 | A1 | 4/2021 | Gao et al. | |
| 2021/0321442 | A1 | 10/2021 | Jung et al. | |
| 2022/0295530 | A1* | 9/2022 | Lee | H04L 1/0031 |
| 2022/0346104 | A1* | 10/2022 | Yi | H04L 1/1614 |
| 2023/0049739 | A1* | 2/2023 | Yang | H04L 5/0055 |
| 2023/0155783 | A1* | 5/2023 | Liu | H04L 5/0053 370/329 |
| 2023/0412347 | A1* | 12/2023 | Li | H04L 1/1861 |
| 2024/0365318 | A1* | 10/2024 | Khoshnevisan | H04L 1/1864 |
| 2024/0405950 | A1* | 12/2024 | Guo | H04L 1/08 |
| 2025/0055648 | A1* | 2/2025 | Jiang | H04L 1/1854 |

OTHER PUBLICATIONS

3GPP, "Technical Specification Group Radio Access Network; NR; User Equipment (UE) radio access capabilities (Release 16)," 3GPP TS 38.306 V16.7.0 (Dec. 2021), 5G, 156 pages.

International Patent Office—International Search Report and Written Opinion mailed May 11, 2023, from International Patent Application No. PCT/US2023/011281, 13 pages.

3GPP, "Technical Specification Group Radio Access Network; NR; Physical layer procedures for data (Release 17)," 3GPP TS 38.214 V17.0.0 (Dec. 2021), 5G, 217 pages.

Mediatek Inc, "Remaining discussion on multi-PDSCH scheduling design for 52.6-71 GHz NR operation," 3GPP TSG RAN WG1 #107bis-e, R1-2200542, Agenda item: 8.2.5, Jan. 17-25, 2022, e-Meeting, 4 pages.

* cited by examiner

VALID PDSCHs OR PUSCHs WITH MULTIPLE PDSCH OR PUSCH SCHEDULING

CROSS REFERENCE TO RELATED APPLICATION

The present application is a national phase entry under 35 U.S.C. § 371 of International Application No. PCT/US2023/011281, filed Jan. 20, 2023, entitled "VALID PDSCHS OR PUSCHS WITH MULTIPLE PDSCH OR PUSCH SCHEDULING," which claims priority to U.S. Provisional Patent Application No. 63/301,888, which was filed Jan. 21, 2022; and to U.S. Provisional Patent Application No. 63/307,520, which was filed Feb. 7, 2022, the entire disclosures of which are hereby incorporated by reference.

FIELD

Various embodiments generally may relate to the field of wireless communications. For example, some embodiments may relate to determination of valid physical downlink shared channels (PDSCHs) or physical uplink shared channels (PUSCHs) with multiple PDSCH or PUSCH scheduling.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich contents and services.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Various embodiments herein provide techniques to determine valid and invalid physical downlink shared channels (PDSCHs) and/or physical uplink shared channels (PUSCHs) with multi-PDSCH and/or PUSCH scheduling. Embodiments further relate to determination of transmission configuration indicator (TCI) state and/or quasi co-location (QCL) for multi-PDSCH and/or PUSCH scheduling.

Figure 1:
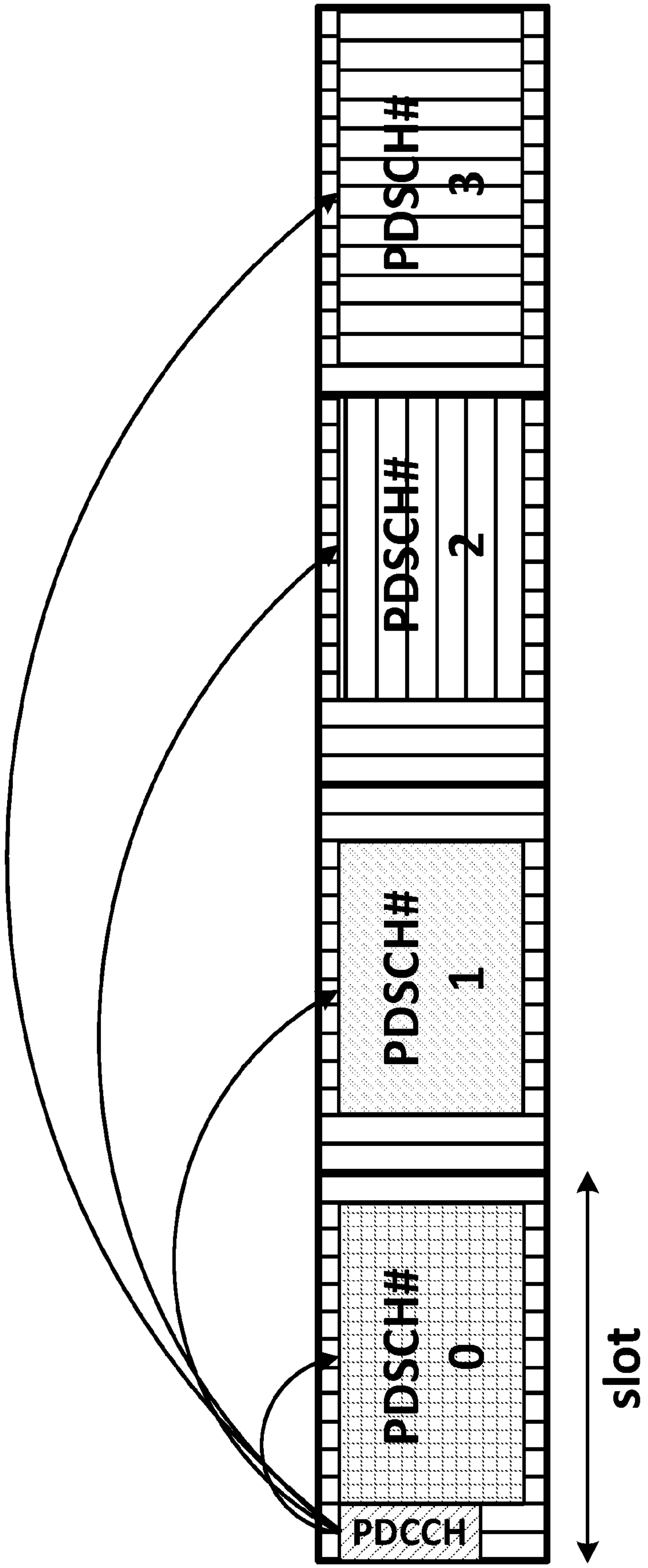
FIG. 1 illustrates an example of multi-transmission time interval (TTI) scheduling for physical downlink shared channels (PDSCHs), in accordance with various embodiments.

For systems operating above 52.6 GHz carrier frequency, the subcarrier spacing (SCS) is increased and the slot duration is reduced. A downlink control information (DCI) may schedule multiple PDSCH or PUSCH transmissions. The different PDSCHs or PUSCHs may carry different transport blocks (TBs). FIG. 1 illustrates one example of multi-PDSCH scheduling. In the example, 4 PDSCHs (PDSCH #0-3) with different TBs are scheduled by a single DCI.

Among the multiple PDSCHs or PUSCHs scheduled by a DCI, it is possible that one or more PDSCHs or PUSCHs may be dropped. For example, for the multiple PDSCHs scheduled by a DCI, if a PDSCH is overlapped with an uplink symbol indicated by semi-static TDD UL-DL configuration, the PDSCH is not valid. On the other hand, for the multiple PUSCHs scheduled by a DCI, if a PUSCH is overlapped with a downlink symbol indicated by semi-static TDD UL-DL configuration or a symbol configured for synchronization signal (SS)/physical broadcast channel (PBCH) transmission, the PUSCH is not valid. Various embodiments herein provide solutions to handle valid PDSCH or PUSCH transmission with multi-PDSCH or multi-PUSCH scheduling.

In embodiments, a DCI for multi-PDSCH or multi-PUSCH scheduling can indicate a row of time domain resource allocation (TDRA) field with one or multiple configured start and length indicator values (SLIVs). Each of the multiple SLIVs is associated with a PDSCH or PUSCH. The number of scheduled PDSCHs or PUSCHs for a row may be equal to the number of configured SLIVs of the row. For a row of the TDRA table, each SLIV can be configured in a different slot. Alternatively, one or more SLIVs may be configured in the same slot.

PUSCH Preparation Time for Multi-PUSCH Scheduling

In one embodiment, in case of multi-PUSCH scheduling, the delay between the ending symbol of a PDCCH and start symbol of the valid PUSCH among the multiple PUSCHs scheduled by the PDCCH should be no less than the PUSCH preparation time, after taking into account the effect of the timing advance. In some embodiments, a valid PUSCH indicates that the PUSCH is not overlapping with a downlink (DL) symbol indicated by a common time domain duplexing (TDD) uplink (UL)-DL configuration (tdd-UL-DL-ConfigurationCommon) or a dedicated TDD UL-DL configuration (tdd-UL-DL-ConfigurationDedicated) if provided, or a symbol of an SS/PBCH block with index provided by ssb-PositionsInBurst, In one option, PUSCH preparation time is checked after determination of the valid PUSCHs among the multiple PUSCHs scheduled by a DCI. A PUSCH is valid if it is not overlapped with a downlink symbol indicated by semi-static TDD UL-DL configuration or with a symbol configured for SS/PBCH transmission. In some embodiments, when the UE is scheduled with multiple PUSCHs by a DCI, the delay between the PDCCH and valid PUSCH should meet the following condition.

If the first uplink symbol in the valid PUSCH allocation for a transport block, including the DM-RS, as defined by the slot offset $K_2$ and $K_{offset}$, if configured, and the start S and length L of the PUSCH allocation indicated by 'Time domain resource assignment of the scheduling DCI and including the effect of the timing advance, is no earlier than at symbol $L_2$, where $L_2$ is defined as the next uplink symbol with its CP starting $T_{proc,2}=\max((N_2+d_{2,1}+d_2)(2048+144)\cdot\kappa 2^{-\mu}\cdot T_C+T_{ext}+T_{switch},d_{2,2})$ after the end of the reception of the last symbol of the PDCCH carrying the DCI scheduling the PUSCH, then the UE shall transmit the transport block. When the PDCCH candidates are associated with a search space set configured with searchSpaceLinking, for the purpose of determining the last symbol of the PDCCH carrying the DCI scheduling the PUSCH, the PDCCH candidate that ends later in time among the two configured PDCCH candidates is used.

Figure 2:
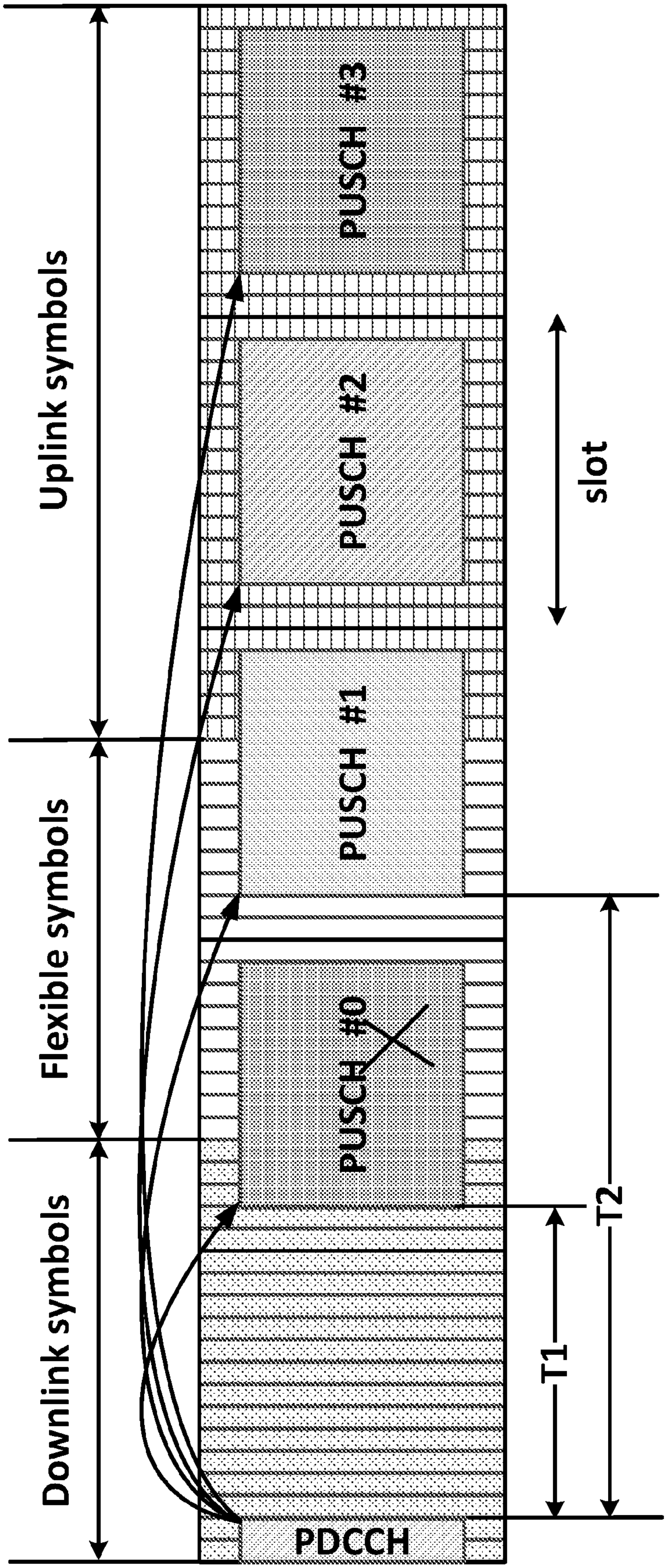
FIG. 2 illustrates an example of physical uplink shared channel (PUSCH) preparation time for a first valid PUSCH #1, in accordance with various embodiments.

FIG. 2 illustrates one example for the PUSCH preparation time of the valid PUSCHs scheduled by a DCI. It is assumed that the DCI schedules a row of TDRA which is configured with 4 SLIVs. The first SLIV, e.g., PUSCH #0 is overlapped with a DL symbol according to semi-static TDD UL-DL configuration, therefore PUSCH #0 is invalid. On the other hand, the other 3 SLIVs are valid since they are overlapped with flexible or uplink symbols in semi-static TDD UL-DL configuration. UE can expect that the delay T2 between the ending symbol of PDCCH and the first symbol of the first valid PUSCH, e.g., PUSCH #1 is no less than the required PUSCH preparation time. On the other hand, there is no requirement on the delay T1 between the ending symbol of PDCCH and the first symbol of the invalid PUSCH #0. That is, it is possible that T1 can be smaller than the required PUSCH preparation time.

In one embodiment, in case of multi-PUSCH scheduling, the delay between the ending symbol of a PDCCH and start symbol of the first valid PUSCH among the multiple PUSCHs scheduled by the PDCCH should be no less than the PUSCH preparation time, after taking into account the effect of the timing advance. In some embodiments, a valid PUSCH indicates that the PUSCH is not overlapping with a DL symbol indicated by tdd-UL-DL-ConfigurationCommon or tdd-UL-DL-ConfigurationDedicated if provided, or a symbol of an SS/PBCH block with index provided by ssb-PositionsInBurst, In one embodiment, in case of multi-PUSCH scheduling, the delay between the ending symbol of a PDCCH and start symbol of each of the multiple PUSCHs scheduled by the PDCCH should be no less than the PUSCH preparation time, after taking into account the effect of the timing advance. Specifically, the above limitation on PUSCH preparation time also applies to a PUSCH that is overlapped with a DL symbol indicated by tdd-UL-DL-ConfigurationCommon or tdd-UL-DL-ConfigurationDedicated if provided, or a symbol of an SS/PBCH block with index provided by ssb-PositionsInBurst.

In some embodiments, when the UE is scheduled with multiple PUSCHs by a DCI, the delay between the PDCCH and a scheduled PUSCH indicated by the TDRA information field should meet the following condition.

If the first uplink symbol in the PUSCH allocation for a transport block indicated by the TDRA information field, including the DM-RS, as defined by the slot offset $K_2$ and $K_{offset}$, if configured, and the start S and length L of the PUSCH allocation indicated by 'Time domain resource assignment' of the scheduling DCI and including the effect of the timing advance, is no earlier than at symbol $L_2$, where $L_2$ is defined as the next uplink symbol with its CP starting $T_{proc,2}=\max((N_2+d_{2,1}+d_2)(2048+144)\cdot\kappa 2^{-\mu}\cdot T_C+T_{ext}+T_{switch},d_{2,2})$ after the end of the reception of the last symbol of the PDCCH carrying the DCI scheduling the PUSCH, then the UE shall transmit the transport block. When the PDCCH candidates are associated with a search space set configured with searchSpaceLinking, for the purpose of determining the last symbol of the PDCCH carrying the DCI scheduling the PUSCH, the PDCCH candidate that ends later in time among the two configured PDCCH candidates is used.

UE PDSCH Reception Preparation Time for Multi-PDSCH Scheduling

In one embodiment, in case of multi-PDSCH scheduling, for cross-carrier scheduling with different SCS, the delay between the ending symbol of a PDCCH and the start symbol of the valid PDSCH among the multiple PUSCHs scheduled by the PDCCH should be no less than a minimum scheduling delay. Denote the PDCCH carrying the scheduling DCI is received on one carrier with one OFDM subcarrier spacing ($\mu_{PDCCH}$), and the PDSCH scheduled to be received by the DCI is on another carrier with another OFDM subcarrier spacing ($\mu_{PDSCH}$).

In some embodiments, a valid PDSCH is the PDSCH that is not overlapping with a UL symbol indicated by tdd-UL-DL-ConfigurationCommon or tdd-UL-DL-Configuration-Dedicated if provided.

In one option, the minimum scheduling delay is checked after determination of the valid PDSCHs among the multiple PDSCHs scheduled by a DCI. A PDSCH is valid if it is not overlapped with an uplink symbol indicated by semi-static TDD UL-DL configuration. In some embodiments, when the UE is scheduled with multiple PDSCHs by a DCI, the delay between the PDCCH and the valid PDSCH should meet one or more of the following conditions.

If the $\mu_{PDCCH}<\mu_{PDSCH}$, the UE is expected to receive the valid scheduled PDSCH, if the first symbol in the PDSCH allocation, including the DM-RS, as defined by the slot offset $K_0$ and the start and length indicator SLIV of the scheduling DCI starts no earlier than the first symbol of the slot of the PDSCH reception starting at least $N_{pdsch}$ PDCCH symbols after the end of the PDCCH scheduling the PDSCH, not taking into account the effect of receive timing difference between the scheduling cell and the scheduled cell.

If the $\mu_{PDCCH}>\mu_{PDSCH}$, the UE is expected to receive the valid scheduled PDSCH, if the first symbol in the PDSCH allocation, including the DM-RS, as defined by the slot offset $K_0$ and the start and length indicator SLIV of the scheduling DCI starts no earlier than $N_{pdsch}$ PDCCH symbols after the end of the PDCCH scheduling the PDSCH, not taking into account the effect of receive timing difference between the scheduling cell and the scheduled cell.

In some embodiments, the value of $N_{pdsch}$ may be determined based on the subcarrier spacing of the PDCCH ($\mu_{PDCCH}$). Table 5.5-1 illustrates an example. In some embodiments, when the PDCCH candidates are associated with a search space set configured with searchSpaceLinking, for the purpose of determining $N_{pdsch}$, the PDCCH candidate that ends later in time among the two configured PDCCH candidates is used.

TABLE 5.5-1

$N_{pdsch}$ as a function of the subcarrier spacing of the scheduling PDCCH

| $\mu_{PDCCH}$ | $N_{pdsch}$ [symbols] |
|---|---|
| 0 | 4 |
| 1 | 5 |
| 2 | 10 |
| 3 | 14 |
| 5 | 56 |
| 6 | 112 |

Figure 3:
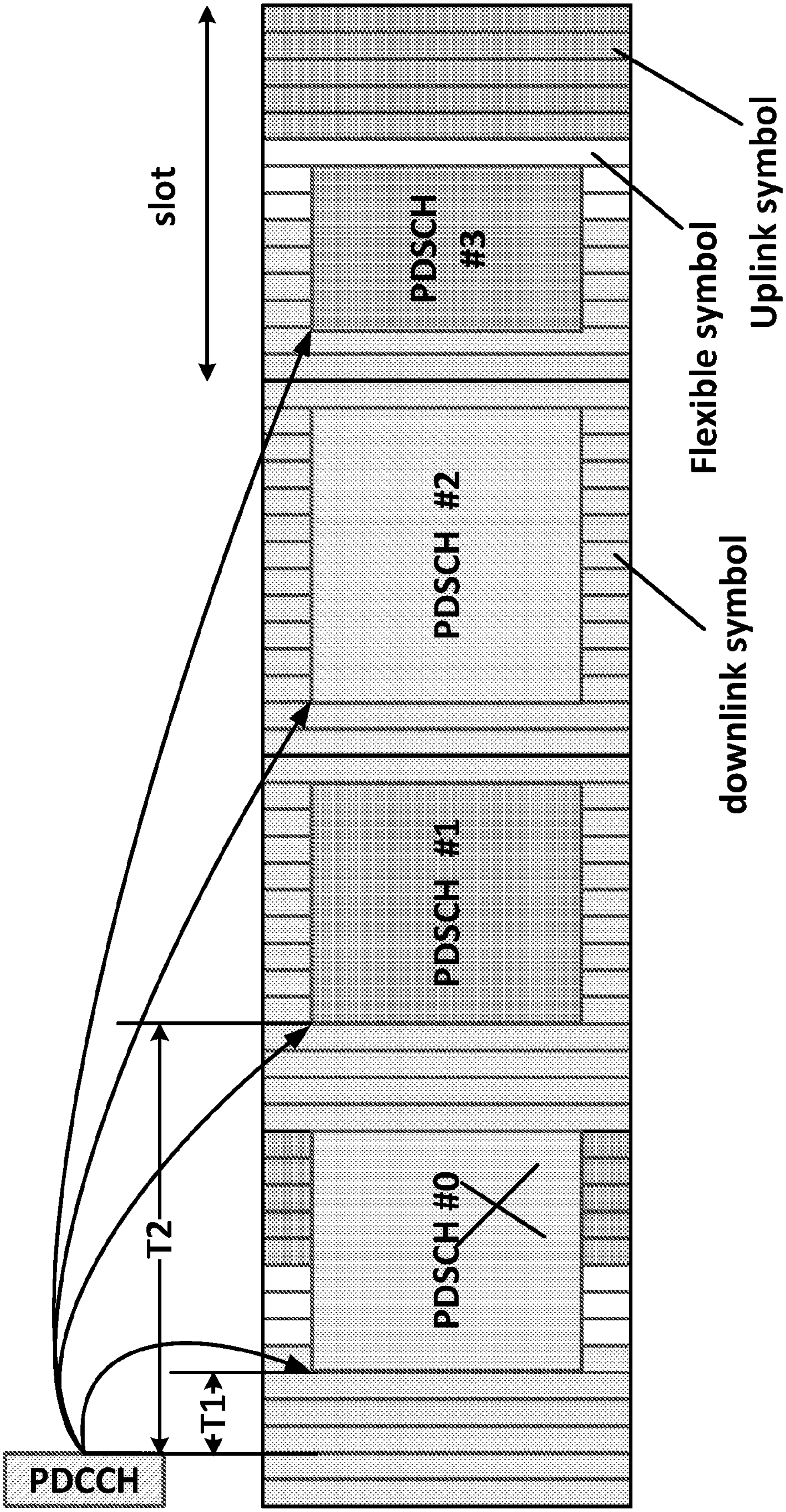
FIG. 3 illustrates an example of minimum scheduling delay for the first valid PDSCH #1, in accordance with various embodiments.

FIG. 3 illustrates one example for the minimum PDCCH to PDSCH scheduling delay for the valid PDSCHs scheduled by a DCI. It is assumed that the DCI schedules a row of TDRA which is configured with 4 SLIVs. The first SLIV, e.g., PDSCH #0 is overlapped with a UL symbol according to semi-static TDD UL-DL configuration, therefore PDSCH #0 is invalid. On the other hand, the other 3 SLIVs are valid since they are overlapped with flexible or downlink symbols in semi-static TDD UL-DL configuration. UE can expect that the delay T2 between the ending symbol of PDCCH and the first symbol of the first valid PDSCH, e.g., PDSCH #1 is no less than the required minimum scheduling delay. On the other hand, there is no requirement on the delay T1 between the ending symbol of PDCCH and the first symbol of the invalid PDSCH #0. That is, it is possible that T1 can be smaller than the required minimum scheduling delay.

In one embodiment, in case of multi-PDSCH scheduling, for cross-carrier scheduling with different SCS, the delay between the ending symbol of a PDCCH and the start symbol of the first valid PDSCH among the multiple PUSCHs scheduled by the PDCCH should be no less than a minimum scheduling delay. Denote the PDCCH carrying the scheduling DCI is received on one carrier with one OFDM subcarrier spacing ($\mu_{PDCCH}$), and the PDSCH scheduled to be received by the DCI is on another carrier with another OFDM subcarrier spacing ($\mu_{PDSCH}$).

In one embodiment, in case of multi-PDSCH scheduling, for cross-carrier scheduling with different SCS, the delay between the ending symbol of a PDCCH and the start symbol of the PDSCH among the multiple PUSCHs scheduled by the PDCCH should be no less than a minimum scheduling delay. Specifically, the above limitation on minimum scheduling delay also applies to a PDSCH that is overlapped with a UL symbol indicated by tdd-UL-DL-ConfigurationCommon or tdd-UL-DL-ConfigurationDedicated if provided.

When the UE is scheduled with multiple PDSCHs by a DCI, the delay between the PDCCH and a scheduled PDSCH indicated by the TDRA information field should meet one or more of the following conditions.

If the $\mu_{PDCCH}<\mu_{PDSCH}$, the UE is expected to receive the scheduled PDSCH indicated by the TDRA information field, if the first symbol in the PDSCH allocation, including the DM-RS, as defined by the slot offset $K_0$ and the start and length indicator SLIV of the scheduling DCI starts no earlier than the first symbol of the slot of the PDSCH reception starting at least $N_{pdsch}$ PDCCH symbols after the end of the PDCCH scheduling the PDSCH, not taking into account the effect of receive timing difference between the scheduling cell and the scheduled cell.

If the $\mu_{PDCCH}>\mu_{PDSCH}$, the UE is expected to receive the scheduled PDSCH indicated by the TDRA information field, if the first symbol in the PDSCH allocation, including the DM-RS, as defined by the slot offset $K_0$ and the start and length indicator SLIV of the scheduling DCI starts no earlier than $N_{pdsch}$ PDCCH symbols after the end of the PDCCH scheduling the PDSCH, not taking into account the effect of receive timing difference between the scheduling cell and the scheduled cell.

When the PDCCH candidates are associated with a search space set configured with searchSpaceLinking, for the purpose of determining $N_{pdsch}$, the PDCCH candidate that ends later in time among the two configured PDCCH candidates is used.

TCI State/QCL Determination for Multi-PDSCH Scheduling

In one embodiment, when the UE is configured with a multi-PDSCH transmission, the indicated TCI state may be based on the activated TCI states in the first slot with the valid PDSCH, and UE shall expect the activated TCI states are the same across the slots with the scheduled PDSCHs. In this scheme, an activated TCI state is determined after determination of the valid PDSCHs among the multiple PDSCHs scheduled by a DCI. In some embodiments, a PDSCH is valid if it is not overlapped with an uplink symbol indicated by semi-static TDD UL-DL configuration.

When the UE is configured with a multi-slot PDSCH, the indicated TCI state may be based on the activated TCI states in the first slot with the scheduled PDSCH, and UE may expect the activated TCI states are the same across the slots with the scheduled PDSCH. When the UE is configured with higher layer parameter PDSCH time domain allocation list for multi-PDSCH (pdsch-TimeDomainAllocationListForMultiPDSCH-r17) and not configured with a multi-slot PDSCH, the indicated TCI state should be based on the activated TCI states in the slot corresponding to the first valid PDSCH.

In one option, if tci-PresentInDCI is set to ‘enabled’ or tci-PresentDCI-1-2 is configured for the control resource set (CORESET) scheduling the PDSCH, and the time offset between the reception of the DL DCI and the corresponding first valid PDSCH is equal to or greater than timeDurationForQCL if applicable, after a UE receives an initial higher layer configuration of TCI states and before reception of the activation command, the UE may assume that the DM-RS ports of PDSCH of a serving cell are quasi co-located with the SS/PBCH block determined in the initial access procedure with respect to qcl-Type set to 'typeA', and when applicable, also with respect to qcl-Type set to 'typeD'.

In another option, if the PDSCH is scheduled by a DCI format not having the TCI field present, and the time offset between the reception of the DL DCI and the corresponding first valid PDSCH of a serving cell is equal to or greater than a threshold time DurationForQCL if applicable, where the threshold is based on reported UE capability (e.g., as described in 3GPP Technical Standard (TS) 38.306), for determining PDSCH antenna port quasi co-location, the UE assumes that the TCI state or the QCL assumption for the PDSCH is identical to the TCI state or QCL assumption whichever is applied for the CORESET used for the PDCCH transmission within the active BWP of the serving cell.

In another option, when a UE is configured with both sfnSchemePdech and sfnSchemePdsch scheduled by DCI format 1_0 or by DCI format 1_1/1_2, if the time offset between the reception of the DL DCI and the corresponding first valid PDSCH of a serving cell is equal to or greater than a threshold timeDurationForQCL if applicable:

if the UE supports DCI scheduling without TCI field, the UE assumes that the TCI state(s) or the QCL assumption(s) for the PDSCH is identical to the TCI state(s) or QCL assumption(s) whichever is applied for the CORESET used for the reception of the DL DCI within the active BWP of the serving cell regardless of the number of active TCI states of the CORESET. If the UE does not support dynamic switching between SFN PDSCH and non-SFN PDSCH, the UE should be activated with the CORESET with two TCI states.

else if the UE does not support DCI scheduling without TCI field, the UE shall expect TCI field present when scheduled by DCI format 1_1/1_2.

In another option, for PDSCH scheduled by DCI format 1_0, 1_1, 1_2, when a UE is configured with sfnSchemePdech set to 'sfnSchemeA' and sfnSchemePdsch is not configured, and there is no TCI codepoint with two TCI states in the activation command, and if the time offset between the reception of the DL DCI and the corresponding first valid PDSCH is equal or larger than the threshold timeDurationForQCL if applicable and the CORESET which schedules the PDSCH is indicated with two TCI states, the UE assumes that the TCI state or the QCL assumption for the PDSCH is identical to the first TCI state or QCL assumption which is applied for the CORESET used for the PDCCH transmission within the active BWP of the serving cell.

In another option, the UE may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding first valid_PDSCH is equal to or greater than a threshold timeDurationForQCL, where the threshold is based on reported UE capability (as described in TS 38.306). When the UE is configured with a single slot PDSCH, the indicated TCI state should be based on the activated TCI states in the slot with the scheduled PDSCH.

In another option, when the UE is configured with CORESET associated with a search space set for cross-carrier scheduling and the UE is not configured with enableDefaultBeamForCCS, the UE expects tci-PresentInDCI is set as 'enabled' or tci-PresentDCI-1-2 is configured for the CORESET, and if one or more of the TCI states configured for the serving cell scheduled by the search space set contains qcl-Type set to 'typeD', the UE expects the time offset between the reception of the detected PDCCH in the search space set and the corresponding first valid PDSCH is larger than or equal to the threshold time DurationForQCL.

In one option, independent of the configuration of tci-PresentInDCI and tci-PresentDCI-1-2 in RRC connected mode, if the offset between the reception of the DL DCI and the corresponding first valid PDSCH is less than the threshold time DurationForQCL and at least one configured TCI state for the serving cell of scheduled PDSCH contains qcl-Type set to 'typeD', the UE may assume that the DM-RS ports of PDSCH(s) of a serving cell are quasi co-located with the RS(s) with respect to the QCL parameter(s) used for PDCCH quasi co-location indication of the CORESET associated with a monitored search space with the lowest controlResource SetId in the latest slot in which one or more CORESETs within the active BWP of the serving cell are monitored by the UE. In this case, if the qcl-Type is set to 'typeD' of the PDSCH DM-RS is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers).

If a UE is configured with enable DefaultTCI-StatePerCoresetPoolIndex and the UE is configured by higher layer parameter PDC CH-Config that contains two different values of coresetPoolIndex in different ControlResourceSets, the UE may assume that the DM-RS ports of PDSCH associated with a value of coresetPoolIndex of a serving cell are quasi co-located with the RS(s) with respect to the QCL parameter(s) used for PDCCH quasi co-location indication of the CORESET associated with a monitored search space with the lowest controlResourceSetId among CORESETs, which are configured with the same value of coresetPoolIndex as the PDCCH scheduling that PDSCH, in the latest slot in which one or more CORESETs associated with the same value of coresetPoolIndex as the PDCCH scheduling that PDSCH within the active BWP of the serving cell are monitored by the UE. In this case, if the 'QCL-TypeD' of the PDSCH DM-RS is different from that of the PDCCH DM-RS with which they overlap in at least one symbol and they are associated with same value of coresetPoolIndex, the UE is expected to prioritize the reception of PDCCH associated with that CORESET. This also applies to the intra-band CA case (when PDSCH and the CORESET are in different component carriers).

If a UE is configured with enableTwoDefaultTCI-States, and at least one TCI codepoint indicates two TCI states, the UE may assume that the DM-RS ports of PDSCH or PDSCH transmission occasions of a serving cell are quasi co-located with the RS(s) with respect to the QCL parameter(s) associated with the TCI states corresponding to the lowest codepoint among the TCI codepoints containing two different TCI states. When the UE is configured by higher layer parameter repetitionScheme set to 'tdmSchemeA' or is configured with higher layer parameter repetitionNumber, and the offset between the reception of the DL DCI and the first PDSCH transmission occasion is less than the threshold timeDurationForQCL, the mapping of the TCI states to PDSCH transmission occasions is determined according to clause 5.1.2.1 by replacing the indicated TCI states with the TCI states corresponding to the lowest codepoint among the TCI codepoints containing two different TCI states based on the activated TCI states in the slot with the first PDSCH transmission occasion. In this case, if the 'QCL-TypeD' in both of the TCI states corresponding to the lowest codepoint among the TCI codepoints containing two different TCI states is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers)

In another option, if the PDCCH carrying the scheduling DCI is received on one component carrier, and the PDSCH scheduled by that DCI is on another component carrier:

The timeDurationForQCL is determined based on the subcarrier spacing of the scheduled PDSCH. If $\mu_{PDCCH}<\mu_{PDSCH}$ an additional timing delay $$d\frac{2^{\mu_{PDSCH}}}{2^{\mu_{PDCCH}}}$$

is added to the time DurationForQCL, where d is defined in 5.2.1.5.1a-1, otherwise d is zero;

When the UE is configured with enable DefaultBeamForCCS, if the offset between the reception of the DL DCI and the corresponding first valid PDSCH is less than the threshold time DurationForQCL, or if the DL DCI does not have the TCI field present, the UE obtains its QCL assumption for the scheduled PDSCH from the activated TCI state with the lowest ID applicable to PDSCH in the active BWP of the scheduled cell.

In another option, when the PDCCH candidates are associated with a search space set configured with searchSpaceLinking, for the configuration of tci-PresentInDCI or tci-PresentDCI-1-2, the UE expects the same configuration in the first and second CORESETs associated with the configured PDCCH candidates; and if the PDSCH is scheduled by a DCI format not having the TCI field present and if the scheduling offset between the DCI and the corresponding first valid PDSCH is equal to or larger than time DurationForQCL, if applicable, PDSCH QCL assumption is based on the CORESET with lower ID among the first and second CORESETs associated with the configured PDCCH candidates.

Figure 4:
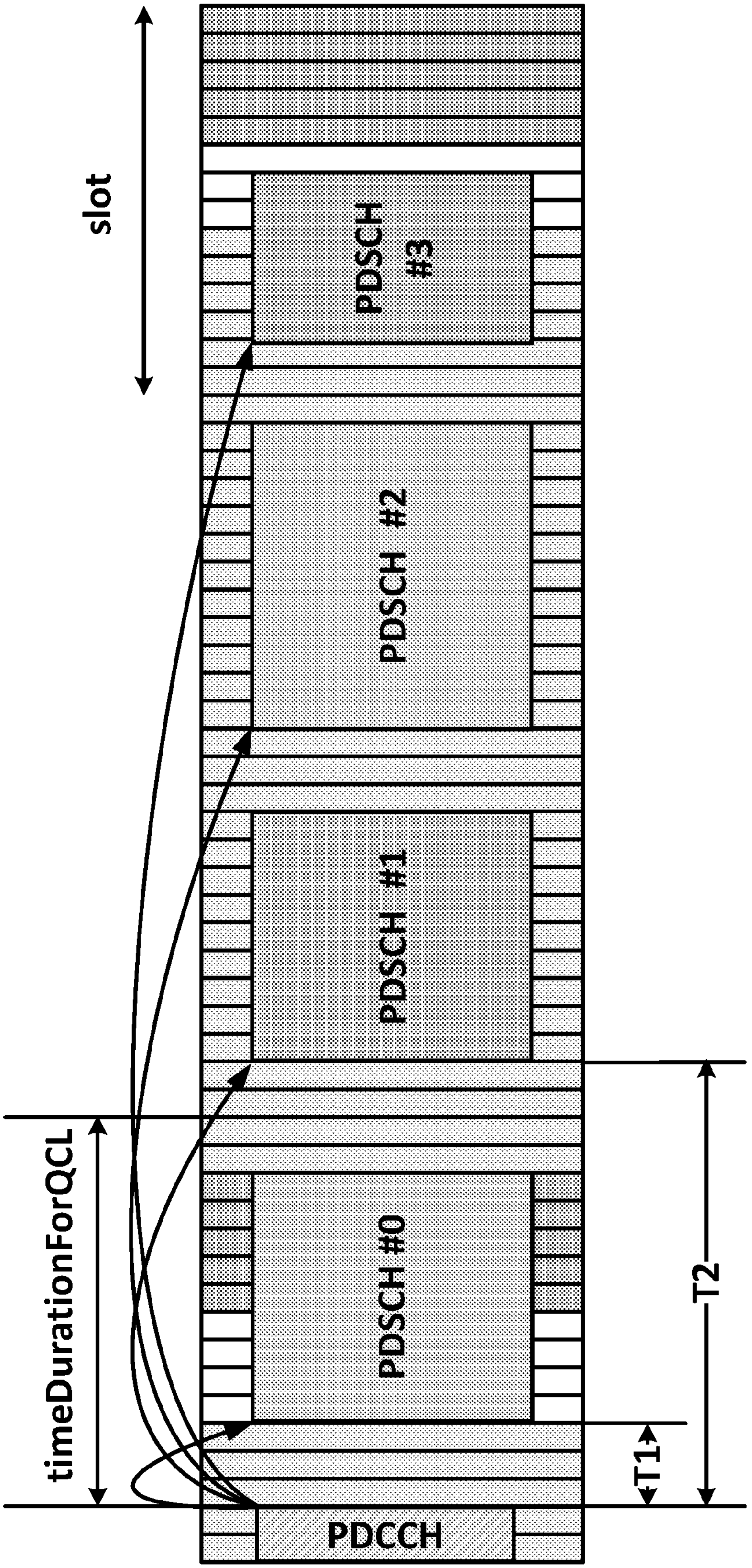
FIG. 4 illustrates an example of transmission configuration indicator (TCI) state determination by the first valid PDSCH #1, in accordance with various embodiments.

FIG. 4 illustrates one example for the TCI state determination for the valid PDSCHs scheduled by a DCI. It is assumed that the DCI schedules a row of TDRA which is configured with 4 SLIVs. The first SLIV, e.g., PDSCH #0 is overlapped with a UL symbol according to semi-static TDD UL-DL configuration, therefore PDSCH #0 is invalid. On the other hand, the other 3 SLIVs are valid since they are overlapped with flexible or downlink symbols in semi-static TDD UL-DL configuration. In FIG. 4, the delay T2 between the ending symbol of PDCCH and the first symbol of the first valid PDSCH, e.g., PDSCH #1 is larger than timeDurationForQCL. Therefore, UE receives the valid PDSCH 1/2/3 according to the TCI state indicated by the DCI. There is no requirement on the delay T1 between the ending symbol of PDCCH and the first symbol of the invalid PDSCH #0. That is, even when T1 is less than timeDurationForQCL, UE still use the indicated TCI state by the DCI for PDSCH reception.

Figure 5:
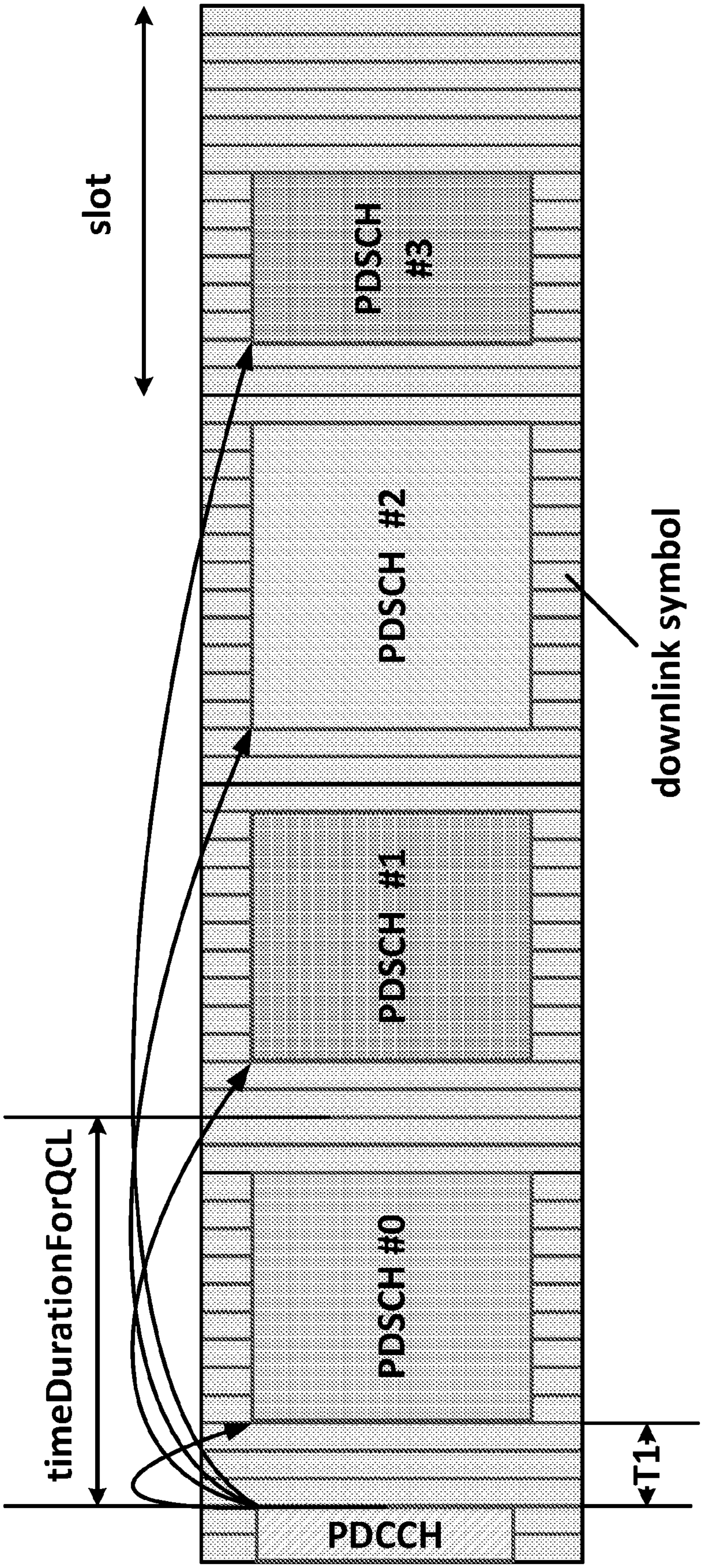
FIG. 5 illustrates an example of TCI state determination by the first valid PDSCH #0, in accordance with various embodiments.

FIG. 5 illustrates another example for the TCI state determination for the valid PDSCHs scheduled by a DCI. It is assumed that the DCI schedules a row of TDRA which is configured with 4 SLIVs. It assumes all symbols are DL symbols according to semi-static TDD UL-DL configuration, therefore all 4 PDSCHs are invalid. In FIG. 5, the delay T1 between the ending symbol of PDCCH and the first symbol of the first valid PDSCH, e.g., PDSCH #0 is less than time DurationForQCL. Therefore, UE receives the 4 valid PDSCHs assuming that the DM-RS ports of PDSCHs are quasi co-located with the RS(s) with respect to the QCL parameter(s) used for PDCCH quasi co-location indication of the CORESET associated with a monitored search space with the lowest controlResourceSetId in the latest slot in which one or more CORESETs within the active BWP of the serving cell are monitored by the UE.

In one embodiment, when the UE is configured with a multi-PDSCH transmission, the indicated TCI state should be based on the activated TCI states in the first slot with the scheduled PDSCH indicated by the TDRA information field, and UE shall expect the activated TCI states are the same across the slots with the scheduled PDSCHs. Specifically, the scheduled PDSCH in the above first slot may be overlapped with a UL symbol indicated by tdd-UL-DL-ConfigurationCommon or tdd-UL-DL-ConfigurationDedicated if provided. In this scheme, an activated TCI state is determined by the scheduled PDSCHs associated with the first configured SLIV of the indicated row of the TDRA field by the DCI.

When the UE is configured with a multi-slot PDSCH, the indicated TCI state should be based on the activated TCI states in the first slot with the scheduled PDSCH, and UE shall expect the activated TCI states are the same across the slots with the scheduled PDSCH. When the UE is configured with higher payer parameter pdsch-TimeDomainAllocationListForMultiPDSCH-r17 and not configured with a multi-slot PDSCH, the indicated TCI state should be based on the activated TCI states in the slot corresponding to the first scheduled PDSCH indicated by the TDRA information field.

In one option, if tci-PresentInDCI is set to 'enabled' or tci-PresentDCI-1-2 is configured for the CORESET scheduling the PDSCH, and the time offset between the reception of the DL DCI and the corresponding first scheduled PDSCH indicated by the TDRA information field is equal to or greater than timeDurationForQCL if applicable, after a UE receives an initial higher layer configuration of TCI states and before reception of the activation command, the UE may assume that the DM-RS ports of PDSCH of a serving cell are quasi co-located with the SS/PBCH block determined in the initial access procedure with respect to qcl-Type set to 'typeA', and when applicable, also with respect to qcl-Type set to 'typeD'.

In another option, if the PDSCH is scheduled by a DCI format not having the TCI field present, and the time offset between the reception of the DL DCI and the corresponding first scheduled PDSCH indicated by the TDRA information field of a serving cell is equal to or greater than a threshold time DurationForQCL if applicable, where the threshold is based on reported UE capability (as described in TS 38.306), for determining PDSCH antenna port quasi co-location, the UE assumes that the TCI state or the QCL assumption for the PDSCH is identical to the TCI state or QCL assumption whichever is applied for the CORESET used for the PDCCH transmission within the active BWP of the serving cell.

In another option, when a UE is configured with both sfnSchemePdech and sfnSchemePdsch scheduled by DCI format 1_0 or by DCI format 1_1/1_2, if the time offset between the reception of the DL DCI and the corresponding first scheduled PDSCH indicated by the TDRA information field of a serving cell is equal to or greater than a threshold time DurationForQCL if applicable:

if the UE supports DCI scheduling without TCI field, the UE assumes that the TCI state(s) or the QCL assumption(s) for the PDSCH is identical to the TCI state(s) or QCL assumption(s) whichever is applied for the CORESET used for the reception of the DL DCI within the active BWP of the serving cell regardless of the number of active TCI states of the CORESET. If the UE does not support dynamic switching between SFN PDSCH and non-SFN PDSCH, the UE should be activated with the CORESET with two TCI states.

else if the UE does not support DCI scheduling without TCI field, the UE shall expect TCI field present when scheduled by DCI format 1_1/1_2.

In another option, for PDSCH scheduled by DCI format 1_0, 1_1, 1_2, when a UE is configured with sfnSchemePdech set to 'sfnSchemeA' and sfnSchemePdsch is not configured, and there is no TCI codepoint with two TCI states in the activation command, and if the time offset between the reception of the DL DCI and the corresponding first scheduled PDSCH indicated by the TDRA information field is equal or larger than the threshold timeDurationForQCL if applicable and the CORESET which schedules the PDSCH is indicated with two TCI states, the UE assumes that the TCI state or the QCL assumption for the PDSCH is identical to the first TCI state or QCL assumption which is applied for the CORESET used for the PDCCH transmission within the active BWP of the serving cell.

In another option, the UE may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding first scheduled PDSCH indicated by the TDRA information field is equal to or greater than a threshold timeDurationForQCL, where the threshold is based on reported UE capability [TS 38.306]. When the UE is configured with a single slot PDSCH, the indicated TCI state should be based on the activated TCI states in the slot with the scheduled PDSCH.

In another option, when the UE is configured with CORESET associated with a search space set for cross-carrier scheduling and the UE is not configured with enableDefaultBeamForCCS, the UE expects tci-PresentInDCI is set as 'enabled' or tci-PresentDCI-1-2 is configured for the CORESET, and if one or more of the TCI states configured for the serving cell scheduled by the search space set contains qcl-Type set to 'typeD', the UE expects the time offset between the reception of the detected PDCCH in the search space set and the corresponding first scheduled PDSCH indicated by the TDRA information field is larger than or equal to the threshold time DurationForQCL.

In one option, independent of the configuration of tci-PresentInDCI and tci-PresentDCI-1-2 in RRC connected mode, if the offset between the reception of the DL DCI and the corresponding first scheduled PDSCH indicated by the TDRA information field is less than the threshold timeDurationForQCL and at least one configured TCI state for the serving cell of scheduled PDSCH contains qcl-Type set to 'typeD', the UE may assume that the DM-RS ports of PDSCH(s) of a serving cell are quasi co-located with the RS(s) with respect to the QCL parameter(s) used for PDCCH quasi co-location indication of the CORESET associated with a monitored search space with the lowest controlResourceSetId in the latest slot in which one or more CORESETs within the active BWP of the serving cell are monitored by the UE. In this case, if the qcl-Type is set to 'typeD' of the PDSCH DM-RS is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers).

If a UE is configured with enable DefaultTCI-StatePerCoresetPoolIndex and the UE is configured by higher layer parameter PDCCH-Config that contains two different values of coresetPoolIndex in different ControlResourceSets, the UE may assume that the DM-RS ports of PDSCH associated with a value of coresetPoolIndex of a serving cell are quasi co-located with the RS(s) with respect to the QCL parameter(s) used for PDCCH quasi co-location indication of the CORESET associated with a monitored search space with the lowest controlResourceSetId among CORESETs, which are configured with the same value of coresetPoolIndex as the PDCCH scheduling that PDSCH, in the latest slot in which one or more CORESETs associated with the same value of coresetPoolIndex as the PDCCH scheduling that PDSCH within the active BWP of the serving cell are monitored by the UE. In this case, if the 'QCL-TypeD' of the PDSCH DM-RS is different from that of the PDCCH DM-RS with which they overlap in at least one symbol and they are associated with same value of coresetPoolIndex, the UE is expected to prioritize the reception of PDCCH associated with that CORESET. This also applies to the intra-band CA case (when PDSCH and the CORESET are in different component carriers).

If a UE is configured with enableTwoDefaultTCI-States, and at least one TCI codepoint indicates two TCI states, the UE may assume that the DM-RS ports of PDSCH or PDSCH transmission occasions of a serving cell are quasi co-located with the RS(s) with respect to the QCL parameter(s) associated with the TCI states corresponding to the lowest codepoint among the TCI codepoints containing two different TCI states. When the UE is configured by higher layer parameter repetitionScheme set to 'tdmSchemeA' or is configured with higher layer parameter repetitionNumber, and the offset between the reception of the DL DCI and the first PDSCH transmission occasion is less than the threshold timeDurationForQCL, the mapping of the TCI states to PDSCH transmission occasions is determined according to clause 5.1.2.1 by replacing the indicated TCI states with the TCI states corresponding to the lowest codepoint among the TCI codepoints containing two different TCI states based on the activated TCI states in the slot with the first PDSCH transmission occasion. In this case, if the 'QCL-TypeD' in both of the TCI states corresponding to the lowest codepoint among the TCI codepoints containing two different TCI states is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers)

In another option, if the PDCCH carrying the scheduling DCI is received on one component carrier, and the PDSCH scheduled by that DCI is on another component carrier:

The timeDurationForQCL is determined based on the subcarrier spacing of the scheduled PDSCH. If $\mu_{PDCCH}<\mu_{PDSCH}$ an additional timing delay $$d\frac{2^{\mu_{PDSCH}}}{2^{\mu_{PDCCH}}}$$

is added to the time DurationForQCL, where d is defined in 5.2.1.5.1a-1, otherwise d is zero;

When the UE is configured with enable DefaultBeam-ForCCS, if the offset between the reception of the DL DCI and the corresponding first scheduled PDSCH indicated by the TDRA information field is less than the threshold timeDurationForQCL, or if the DL DCI does not have the TCI field present, the UE obtains its QCL assumption for the scheduled PDSCH from the activated TCI state with the lowest ID applicable to PDSCH in the active BWP of the scheduled cell.

In another option, when the PDCCH candidates are associated with a search space set configured with searchSpaceLinking, for the configuration of tci-PresentIn-DCI or tci-PresentDCI-1-2, the UE expects the same configuration in the first and second CORESETs associated with the configured PDCCH candidates; and if the PDSCH is scheduled by a DCI format not having the TCI field present and if the scheduling offset between the DCI and the corresponding first scheduled PDSCH indicated by the TDRA information field is equal to or larger than timeDurationForQCL, if applicable, PDSCH QCL assumption is based on the CORESET with lower ID among the first and second CORESETs associated with the configured PDCCH candidates.

Systems and Implementations

Figure 6:
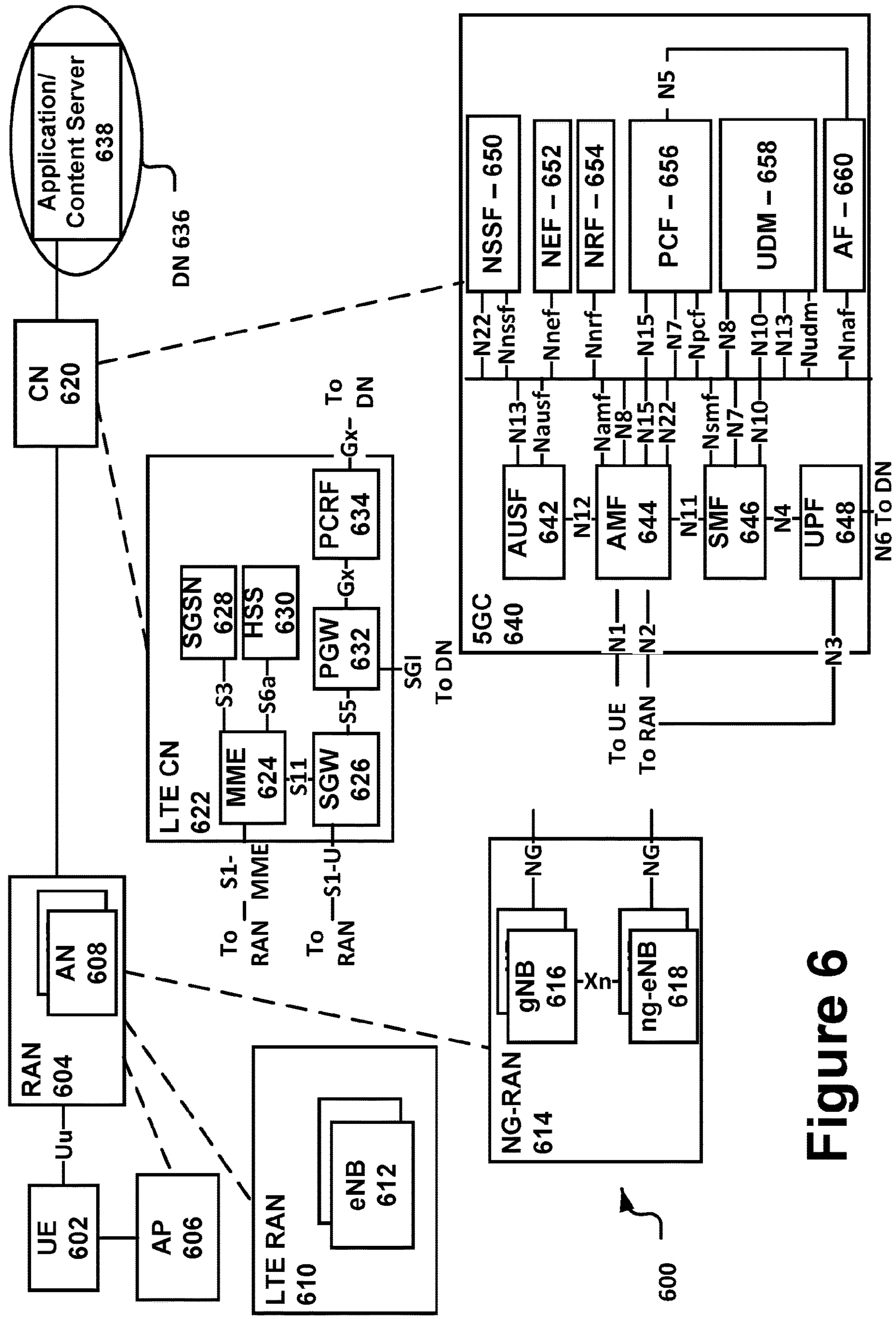
FIG. 6 schematically illustrates a wireless network in accordance with various embodiments.
Figure 7:
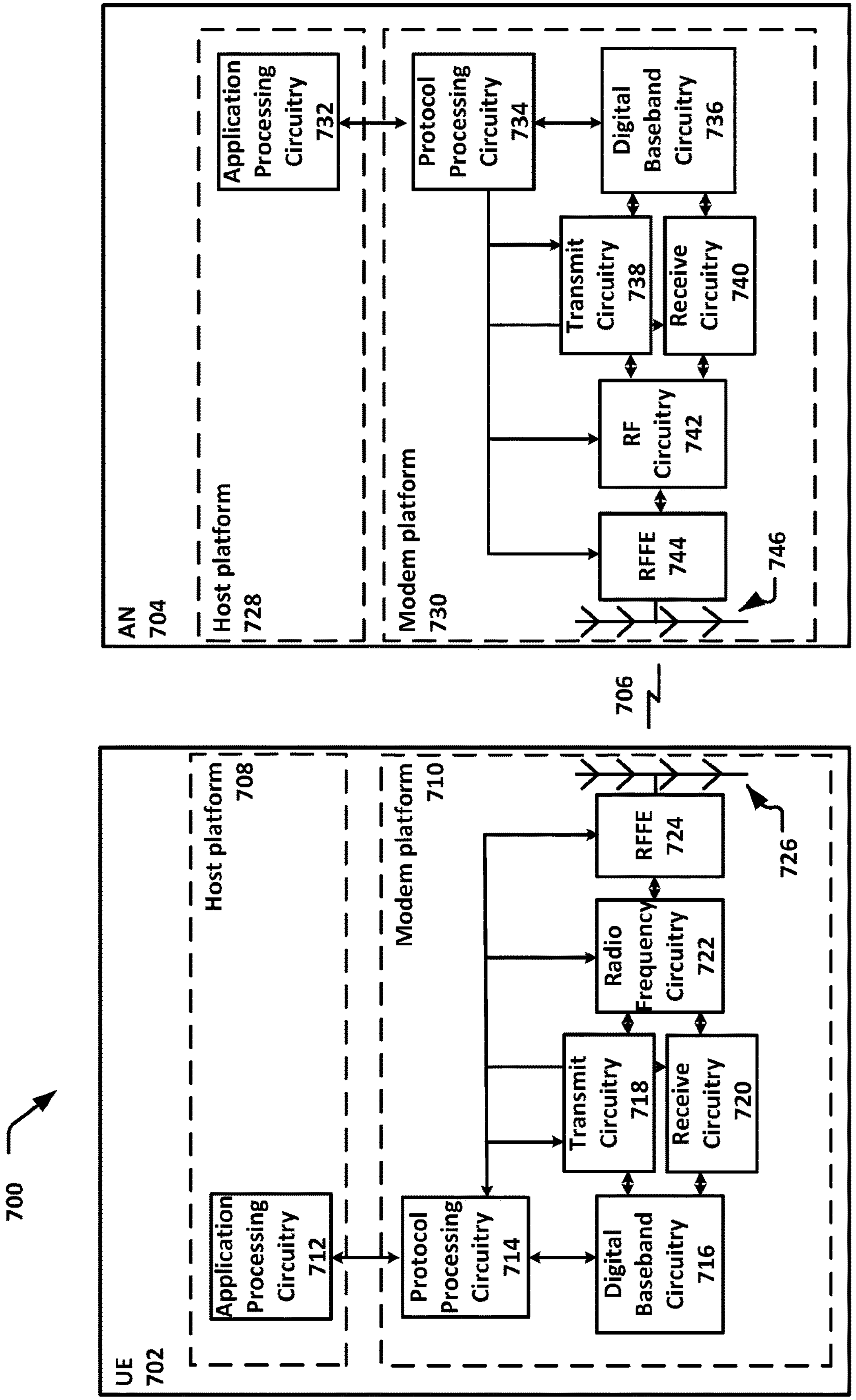
FIG. 7 schematically illustrates components of a wireless network in accordance with various embodiments.
Figure 8:
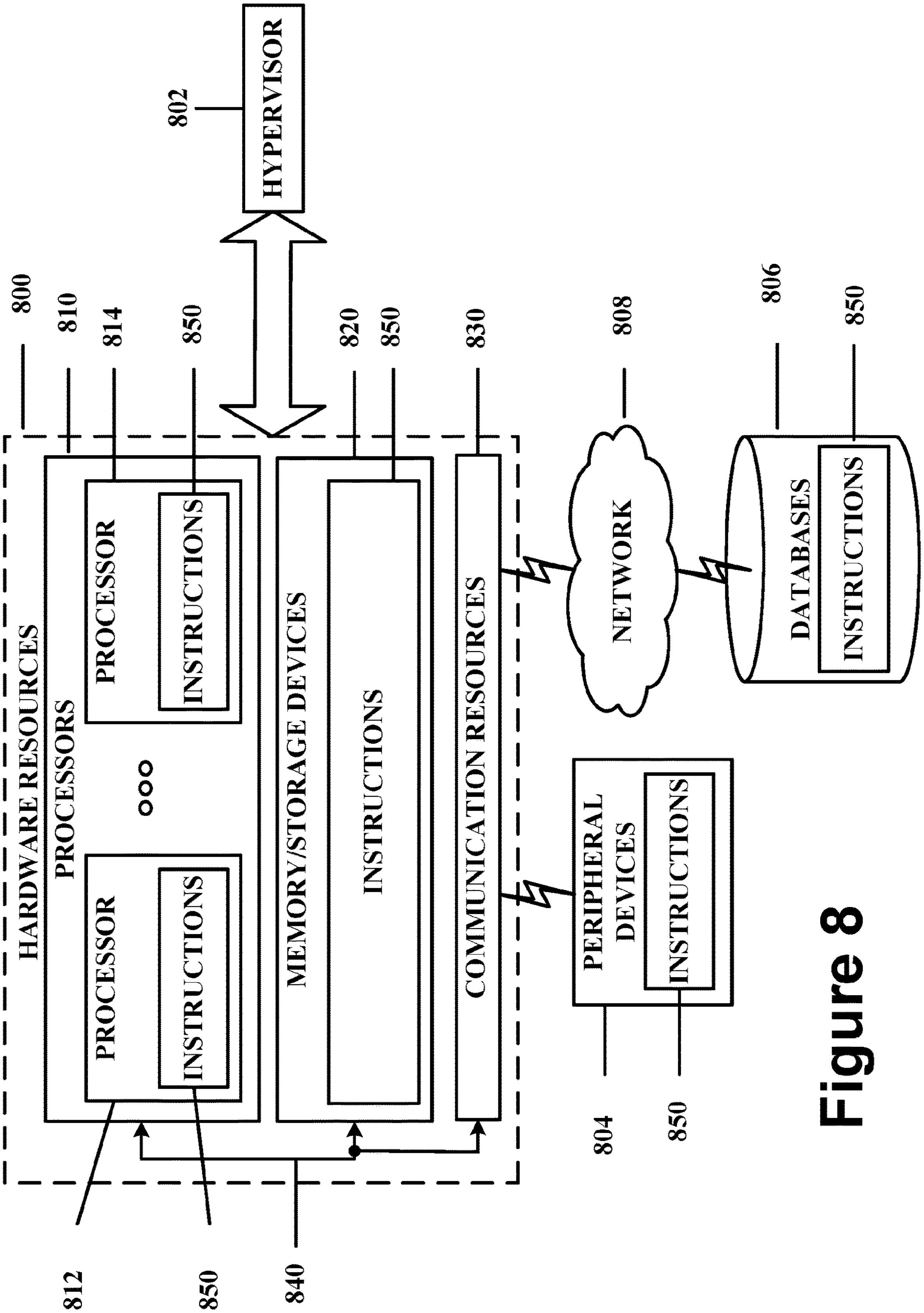
FIG. 8 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 6-8 illustrate various systems, devices, and components that may implement aspects of disclosed embodiments.

FIG. 6 illustrates a network 600 in accordance with various embodiments. The network 600 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 600 may include a UE 602, which may include any mobile or non-mobile computing device designed to communicate with a RAN 604 via an over-the-air connection. The UE 602 may be communicatively coupled with the RAN 604 by a Uu interface. The UE 602 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 600 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 602 may additionally communicate with an AP 606 via an over-the-air connection. The AP 606 may manage a WLAN connection, which may serve to offload some/all network traffic from the RAN 604. The connection between the UE 602 and the AP 606 may be consistent with any IEEE 802.11 protocol, wherein the AP 606 could be a wireless fidelity (Wi-Fi®) router. In some embodiments, the UE 602, RAN 604, and AP 606 may utilize cellular-WLAN aggregation (for example, LWA/LWIP). Cellular-WLAN aggregation may involve the UE 602 being configured by the RAN 604 to utilize both cellular radio resources and WLAN resources.

The RAN 604 may include one or more access nodes, for example, AN 608. AN 608 may terminate air-interface protocols for the UE 602 by providing access stratum protocols including RRC, PDCP, RLC, MAC, and L1 protocols. In this manner, the AN 608 may enable data/voice connectivity between CN 620 and the UE 602. In some embodiments, the AN 608 may be implemented in a discrete device or as one or more software entities running on server computers as part of, for example, a virtual network, which may be referred to as a CRAN or virtual baseband unit pool. The AN 608 be referred to as a BS, gNB, RAN node, eNB, ng-eNB, NodeB, RSU, TRxP, TRP, etc. The AN 608 may be a macrocell base station or a low power base station for providing femtocells, picocells or other like cells having smaller coverage areas, smaller user capacity, or higher bandwidth compared to macrocells.

In embodiments in which the RAN 604 includes a plurality of ANs, they may be coupled with one another via an X2 interface (if the RAN 604 is an LTE RAN) or an Xn interface (if the RAN 604 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 604 may each manage one or more cells, cell groups, component carriers, etc. to provide the UE 602 with an air interface for network access. The UE 602 may be simultaneously connected with a plurality of cells provided by the same or different ANs of the RAN 604. For example, the UE 602 and RAN 604 may use carrier aggregation to allow the UE 602 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 604 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 602 or AN 608 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 604 may be an LTE RAN 610 with eNBs, for example, eNB 612. The LTE RAN 610 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 604 may be an NG-RAN 614 with gNBs, for example, gNB 616, or ng-eNBs, for example, ng-eNB 618. The gNB 616 may connect with 5G-enabled UEs using a 5G NR interface. The gNB 616 may connect with a 5G core through an NG interface, which may include an N2 interface or an N3 interface. The ng-eNB 618 may also connect with the 5G core through an NG interface, but may connect with a UE via an LTE air interface. The gNB 616 and the ng-eNB 618 may connect with each other over an Xn interface.

In some embodiments, the NG interface may be split into two parts, an NG user plane (NG-U) interface, which carries traffic data between the nodes of the NG-RAN 614 and a UPF 648 (e.g., N3 interface), and an NG control plane (NG-C) interface, which is a signaling interface between the nodes of the NG-RAN 614 and an AMF 644 (e.g., N2 interface).

The NG-RAN 614 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 602 can be configured with multiple BWPs where each BWP configuration has a different SCS. When a BWP change is indicated to the UE 602, the SCS of the transmission is changed as well. Another use case example of BWP is related to power saving. In particular, multiple BWPs can be configured for the UE 602 with different amount of frequency resources (for example, PRBs) to support data transmission under different traffic loading scenarios. A BWP containing a smaller number of PRBs can be used for data transmission with small traffic load while allowing power saving at the UE 602 and in some cases at the gNB 616. A BWP containing a larger number of PRBs can be used for scenarios with higher traffic load.

The RAN 604 is communicatively coupled to CN 620 that includes network elements to provide various functions to support data and telecommunications services to customers/subscribers (for example, users of UE 602). The components of the CN 620 may be implemented in one physical node or separate physical nodes. In some embodiments, NFV may be utilized to virtualize any or all of the functions provided by the network elements of the CN 620 onto physical compute/storage resources in servers, switches, etc. A logical instantiation of the CN 620 may be referred to as a network slice, and a logical instantiation of a portion of the CN 620 may be referred to as a network sub-slice.

In some embodiments, the CN 620 may be an LTE CN 622, which may also be referred to as an EPC. The LTE CN 622 may include MME 624, SGW 626, SGSN 628, HSS 630, PGW 632, and PCRF 634 coupled with one another over interfaces (or "reference points") as shown. Functions of the elements of the LTE CN 622 may be briefly introduced as follows.

The MME 624 may implement mobility management functions to track a current location of the UE 602 to facilitate paging, bearer activation/deactivation, handovers, gateway selection, authentication, etc.

The SGW 626 may terminate an SI interface toward the RAN and route data packets between the RAN and the LTE CN 622. The SGW 626 may be a local mobility anchor point for inter-RAN node handovers and also may provide an anchor for inter-3GPP mobility. Other responsibilities may include lawful intercept, charging, and some policy enforcement.

The SGSN 628 may track a location of the UE 602 and perform security functions and access control. In addition, the SGSN 628 may perform inter-EPC node signaling for mobility between different RAT networks; PDN and S-GW selection as specified by MME 624; MME selection for handovers; etc. The S3 reference point between the MME 624 and the SGSN 628 may enable user and bearer information exchange for inter-3GPP access network mobility in idle/active states.

The HSS 630 may include a database for network users, including subscription-related information to support the network entities' handling of communication sessions. The HSS 630 can provide support for routing/roaming, authentication, authorization, naming/addressing resolution, location dependencies, etc. An S6a reference point between the HSS 630 and the MME 624 may enable transfer of subscription and authentication data for authenticating/authorizing user access to the LTE CN 620.

The PGW 632 may terminate an SGi interface toward a data network (DN) 636 that may include an application/content server 638. The PGW 632 may route data packets between the LTE CN 622 and the data network 636. The PGW 632 may be coupled with the SGW 626 by an S5 reference point to facilitate user plane tunneling and tunnel management. The PGW 632 may further include a node for policy enforcement and charging data collection (for example, PCEF). Additionally, the SGi reference point between the PGW 632 and the data network 636 may be an operator external public, a private PDN, or an intra-operator packet data network, for example, for provision of IMS services. The PGW 632 may be coupled with a PCRF 634 via a Gx reference point.

The PCRF 634 is the policy and charging control element of the LTE CN 622. The PCRF 634 may be communicatively coupled to the app/content server 638 to determine appropriate QoS and charging parameters for service flows. The PCRF 632 may provision associated rules into a PCEF (via Gx reference point) with appropriate TFT and QCI.

In some embodiments, the CN 620 may be a 5GC 640. The 5GC 640 may include an AUSF 642, AMF 644, SMF 646, UPF 648, NSSF 650, NEF 652, NRF 654, PCF 656, UDM 658, and AF 660 coupled with one another over interfaces (or "reference points") as shown. Functions of the elements of the 5GC 640 may be briefly introduced as follows.

The AUSF 642 may store data for authentication of UE 602 and handle authentication-related functionality. The AUSF 642 may facilitate a common authentication framework for various access types. In addition to communicating with other elements of the 5GC 640 over reference points as shown, the AUSF 642 may exhibit an Nausf service-based interface.

The AMF 644 may allow other functions of the 5GC 640 to communicate with the UE 602 and the RAN 604 and to subscribe to notifications about mobility events with respect to the UE 602. The AMF 644 may be responsible for registration management (for example, for registering UE 602), connection management, reachability management, mobility management, lawful interception of AMF-related events, and access authentication and authorization. The AMF 644 may provide transport for SM messages between the UE 602 and the SMF 646, and act as a transparent proxy for routing SM messages. AMF 644 may also provide transport for SMS messages between UE 602 and an SMSF. AMF 644 may interact with the AUSF 642 and the UE 602 to perform various security anchor and context management functions. Furthermore, AMF 644 may be a termination point of a RAN CP interface, which may include or be an N2 reference point between the RAN 604 and the AMF 644; and the AMF 644 may be a termination point of NAS (N1) signaling, and perform NAS ciphering and integrity protection. AMF 644 may also support NAS signaling with the UE 602 over an N3 IWF interface.

The SMF 646 may be responsible for SM (for example, session establishment, tunnel management between UPF 648 and AN 608); UE IP address allocation and management (including optional authorization); selection and control of UP function; configuring traffic steering at UPF 648 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 644 over N2 to AN 608; and determining SSC mode of a session. SM may refer to management of a PDU session, and a PDU session or "session" may refer to a PDU connectivity service that provides or enables the exchange of PDUs between the UE 602 and the data network 636.

The UPF 648 may act as an anchor point for intra-RAT and inter-RAT mobility, an external PDU session point of interconnect to data network 636, and a branching point to support multi-homed PDU session. The UPF 648 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 648 may include an uplink classifier to support routing traffic flows to a data network.

The NSSF 650 may select a set of network slice instances serving the UE 602. The NSSF 650 may also determine allowed NSSAI and the mapping to the subscribed S-NSSAIs, if needed. The NSSF 650 may also determine the AMF set to be used to serve the UE 602, or a list of candidate AMFs based on a suitable configuration and possibly by querying the NRF 654. The selection of a set of network slice instances for the UE 602 may be triggered by the AMF 644 with which the UE 602 is registered by interacting with the NSSF 650, which may lead to a change of AMF. The NSSF 650 may interact with the AMF 644 via an N22 reference point; and may communicate with another NSSF in a visited network via an N31 reference point (not shown). Additionally, the NSSF 650 may exhibit an Nnssf service-based interface.

The NEF 652 may securely expose services and capabilities provided by 3GPP network functions for third party, internal exposure/re-exposure, AFs (e.g., AF 660), edge computing or fog computing systems, etc. In such embodiments, the NEF 652 may authenticate, authorize, or throttle the AFs. NEF 652 may also translate information exchanged with the AF 660 and information exchanged with internal network functions. For example, the NEF 652 may translate between an AF-Service-Identifier and an internal 5GC information. NEF 652 may also receive information from other NFs based on exposed capabilities of other NFs. This information may be stored at the NEF 652 as structured data, or at a data storage NF using standardized interfaces. The stored information can then be re-exposed by the NEF 652 to other NFs and AFs, or used for other purposes such as analytics. Additionally, the NEF 652 may exhibit an Nnef service-based interface.

The NRF 654 may support service discovery functions, receive NF discovery requests from NF instances, and provide the information of the discovered NF instances to the NF instances. NRF 654 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 654 may exhibit the Nnrf service-based interface.

The PCF 656 may provide policy rules to control plane functions to enforce them, and may also support unified policy framework to govern network behavior. The PCF 656 may also implement a front end to access subscription information relevant for policy decisions in a UDR of the UDM 658. In addition to communicating with functions over reference points as shown, the PCF 656 exhibit an Npcf service-based interface.

The UDM 658 may handle subscription-related information to support the network entities' handling of communication sessions, and may store subscription data of UE 602. For example, subscription data may be communicated via an N8 reference point between the UDM 658 and the AMF 644. The UDM 658 may include two parts, an application front end and a UDR. The UDR may store subscription data and policy data for the UDM 658 and the PCF 656, and/or structured data for exposure and application data (including PFDs for application detection, application request information for multiple UEs 602) for the NEF 652. The Nudr service-based interface may be exhibited by the UDR 221 to allow the UDM 658, PCF 656, and NEF 652 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 658 may exhibit the Nudm service-based interface.

The AF 660 may provide application influence on traffic routing, provide access to NEF, and interact with the policy framework for policy control.

In some embodiments, the 5GC 640 may enable edge computing by selecting operator/3$^{rd}$ party services to be geographically close to a point that the UE 602 is attached to the network. This may reduce latency and load on the network. To provide edge-computing implementations, the 5GC 640 may select a UPF 648 close to the UE 602 and execute traffic steering from the UPF 648 to data network 636 via the N6 interface. This may be based on the UE subscription data, UE location, and information provided by the AF 660. In this way, the AF 660 may influence UPF (re)selection and traffic routing. Based on operator deployment, when AF 660 is considered to be a trusted entity, the network operator may permit AF 660 to interact directly with relevant NFs. Additionally, the AF 660 may exhibit an Naf service-based interface.

The data network 636 may represent various network operator services, Internet access, or third party services that may be provided by one or more servers including, for example, application/content server 638.

FIG. 7 schematically illustrates a wireless network 700 in accordance with various embodiments. The wireless network 700 may include a UE 702 in wireless communication with an AN 704. The UE 702 and AN 704 may be similar to, and substantially interchangeable with, like-named components described elsewhere herein.

The UE 702 may be communicatively coupled with the AN 704 via connection 706. The connection 706 is illustrated as an air interface to enable communicative coupling, and can be consistent with cellular communications protocols such as an LTE protocol or a 5G NR protocol operating at mmWave or sub-6 GHZ frequencies.

The UE 702 may include a host platform 708 coupled with a modem platform 710. The host platform 708 may include application processing circuitry 712, which may be coupled with protocol processing circuitry 714 of the modem platform 710. The application processing circuitry 712 may run various applications for the UE 702 that source/sink application data. The application processing circuitry 712 may further implement one or more layer operations to transmit/receive application data to/from a data network. These layer operations may include transport (for example UDP) and Internet (for example, IP) operations The protocol processing circuitry 714 may implement one or more of layer operations to facilitate transmission or reception of data over the connection 706. The layer operations implemented by the protocol processing circuitry 714 may include, for example, MAC, RLC, PDCP, RRC and NAS operations.

The modem platform 710 may further include digital baseband circuitry 716 that may implement one or more layer operations that are "below" layer operations performed by the protocol processing circuitry 714 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 710 may further include transmit circuitry 718, receive circuitry 720, RF circuitry 722, and RF front end (RFFE) 724, which may include or connect to one or more antenna panels 726. Briefly, the transmit circuitry 718 may include a digital-to-analog converter, mixer, intermediate frequency (IF) components, etc.; the receive circuitry 720 may include an analog-to-digital converter, mixer, IF components, etc.; the RF circuitry 722 may include a low-noise amplifier, a power amplifier, power tracking components, etc.; RFFE 724 may include filters (for example, surface/bulk acoustic wave filters), switches, antenna tuners, beamforming components (for example, phase-array antenna components), etc. The selection and arrangement of the components of the transmit circuitry 718, receive circuitry 720, RF circuitry 722, RFFE 724, and antenna panels 726 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 714 may include one or more instances of control circuitry (not shown) to provide control functions for the transmit/receive components.

A UE reception may be established by and via the antenna panels 726, RFFE 724, RF circuitry 722, receive circuitry 720, digital baseband circuitry 716, and protocol processing circuitry 714. In some embodiments, the antenna panels 726 may receive a transmission from the AN 704 by receive-beamforming signals received by a plurality of antennas/antenna elements of the one or more antenna panels 726.

A UE transmission may be established by and via the protocol processing circuitry 714, digital baseband circuitry 716, transmit circuitry 718, RF circuitry 722, RFFE 724, and antenna panels 726. In some embodiments, the transmit components of the UE 704 may apply a spatial filter to the data to be transmitted to form a transmit beam emitted by the antenna elements of the antenna panels 726.

Similar to the UE 702, the AN 704 may include a host platform 728 coupled with a modem platform 730. The host platform 728 may include application processing circuitry 732 coupled with protocol processing circuitry 734 of the modem platform 730. The modem platform may further include digital baseband circuitry 736, transmit circuitry 738, receive circuitry 740, RF circuitry 742, RFFE circuitry 744, and antenna panels 746. The components of the AN 704 may be similar to and substantially interchangeable with like-named components of the UE 702. In addition to performing data transmission/reception as described above, the components of the AN 708 may perform various logical functions that include, for example, RNC functions such as radio bearer management, uplink and downlink dynamic radio resource management, and data packet scheduling.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840 or other interface circuitry. For embodiments where node virtualization (e.g., NFV) is utilized, a hypervisor 802 may be executed to provide an execution environment for one or more network slices/sub-slices to utilize the hardware resources 800.

The processors 810 may include, for example, a processor 812 and a processor 814. The processors 810 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 820 may include main memory, disk storage, or any suitable combination thereof. The memory/storage devices 820 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 830 may include interconnection or network interface controllers, components, or other suitable devices to communicate with one or more peripheral devices 804 or one or more databases 806 or other network elements via a network 808. For example, the communication resources 830 may include wired communication components (e.g., for coupling via USB, Ethernet, etc.), cellular communication components, NFC components, Bluetooth® (or Bluetooth® Low Energy) components, Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

Example Procedures

Figure 9:
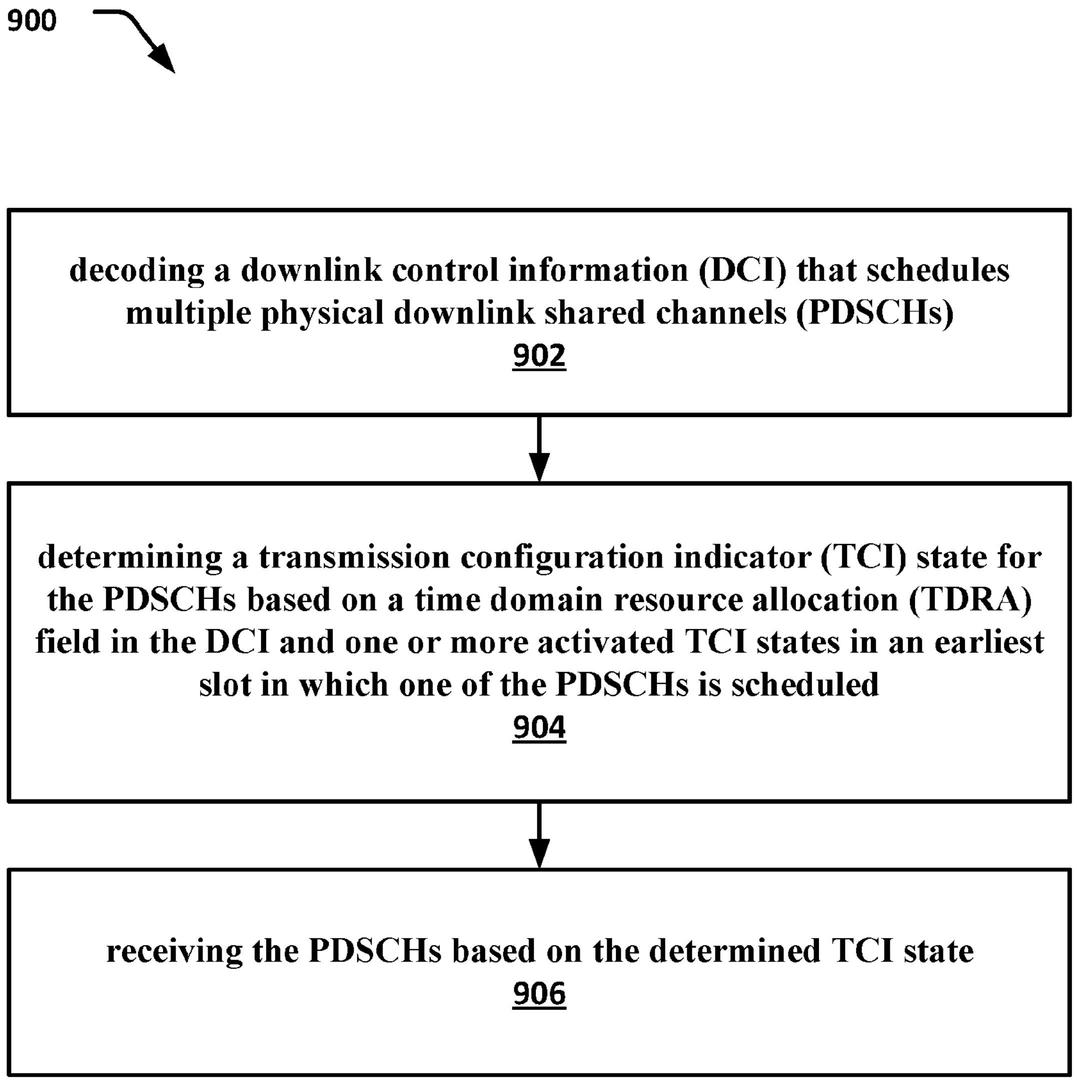
FIGS. 9, 10, and 11 illustrate example procedures to practice the various embodiments herein.

In some embodiments, the electronic device(s), network(s), system(s), chip(s) or component(s), or portions or implementations thereof, of FIGS. 6-8, or some other figure herein, may be configured to perform one or more processes, techniques, or methods as described herein, or portions thereof. For example, FIG. 9 illustrates an example process 900 in accordance with various embodiments. The process 900 may be performed by a UE or a portion thereof. At 902, the process 900 may include decoding a downlink control information (DCI) that schedules multiple physical downlink shared channels (PDSCHs). At 904, the process 900 may further include determining a transmission configuration indicator (TCI) state for the PDSCHs based on a time domain resource allocation (TDRA) field in the DCI and one or more activated TCI states in an earliest slot in which one of the PDSCHs is scheduled. At 906, the process 900 may further include receiving the PDSCHs based on the determined TCI state.

Figure 10:
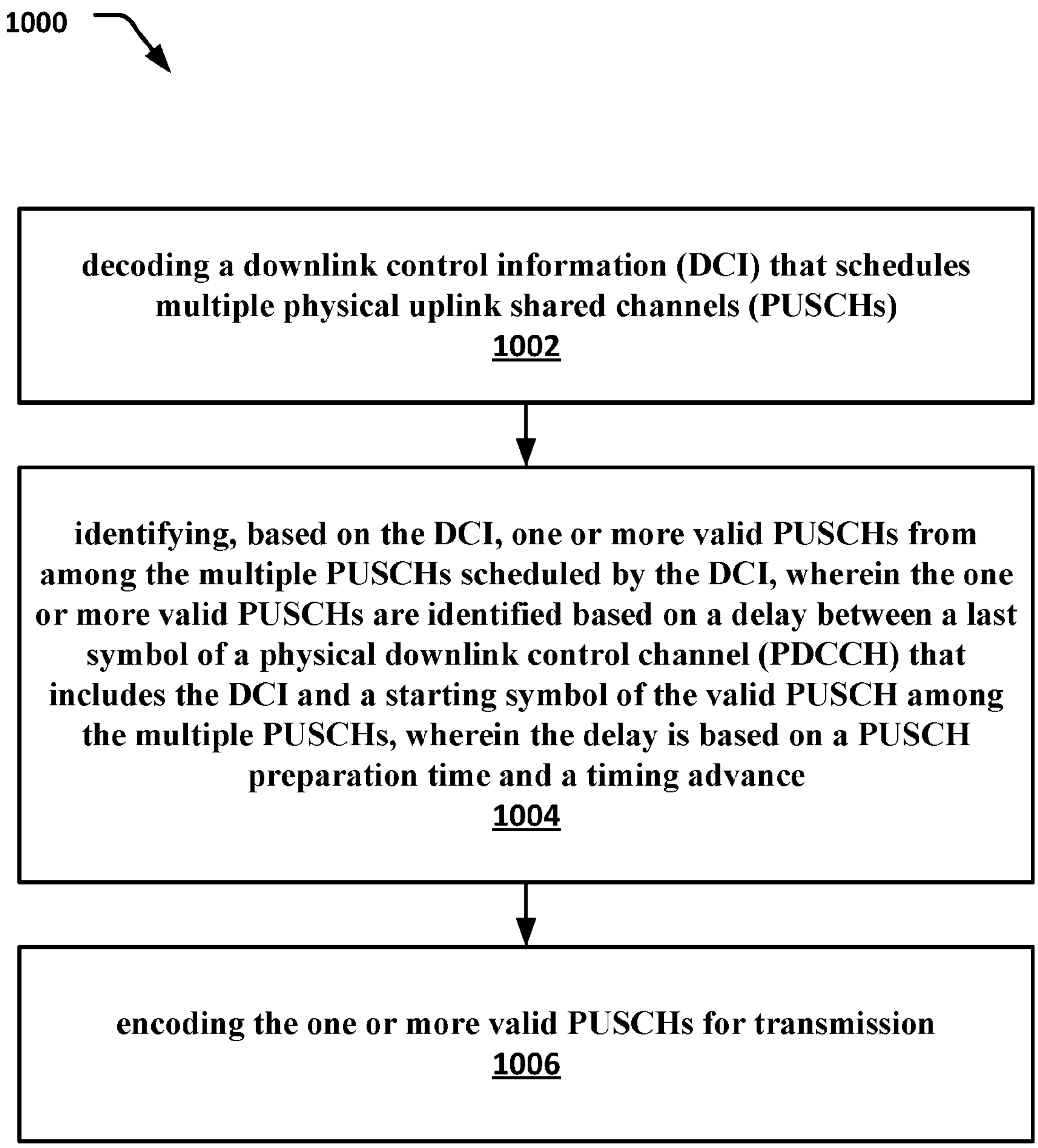

FIG. 10 illustrates another process 1000 in accordance with various embodiments. The process 1000 may be performed by a UE or a portion thereof. At 1002, the process 1000 may include decoding a downlink control information (DCI) that schedules multiple physical uplink shared channels (PUSCHs). At 1004, the process 1000 may further include identifying, based on the DCI, one or more valid PUSCHs from among the multiple PUSCHs scheduled by the DCI, wherein the one or more valid PUSCHs are identified based on a delay between a last symbol of a physical downlink control channel (PDCCH) that includes the DCI and a starting symbol of the valid PUSCH among the multiple PUSCHs, wherein the delay is based on a PUSCH preparation time and a timing advance. At 1006, the process 1000 may further include encoding the one or more valid PUSCHs for transmission.

Figure 11:
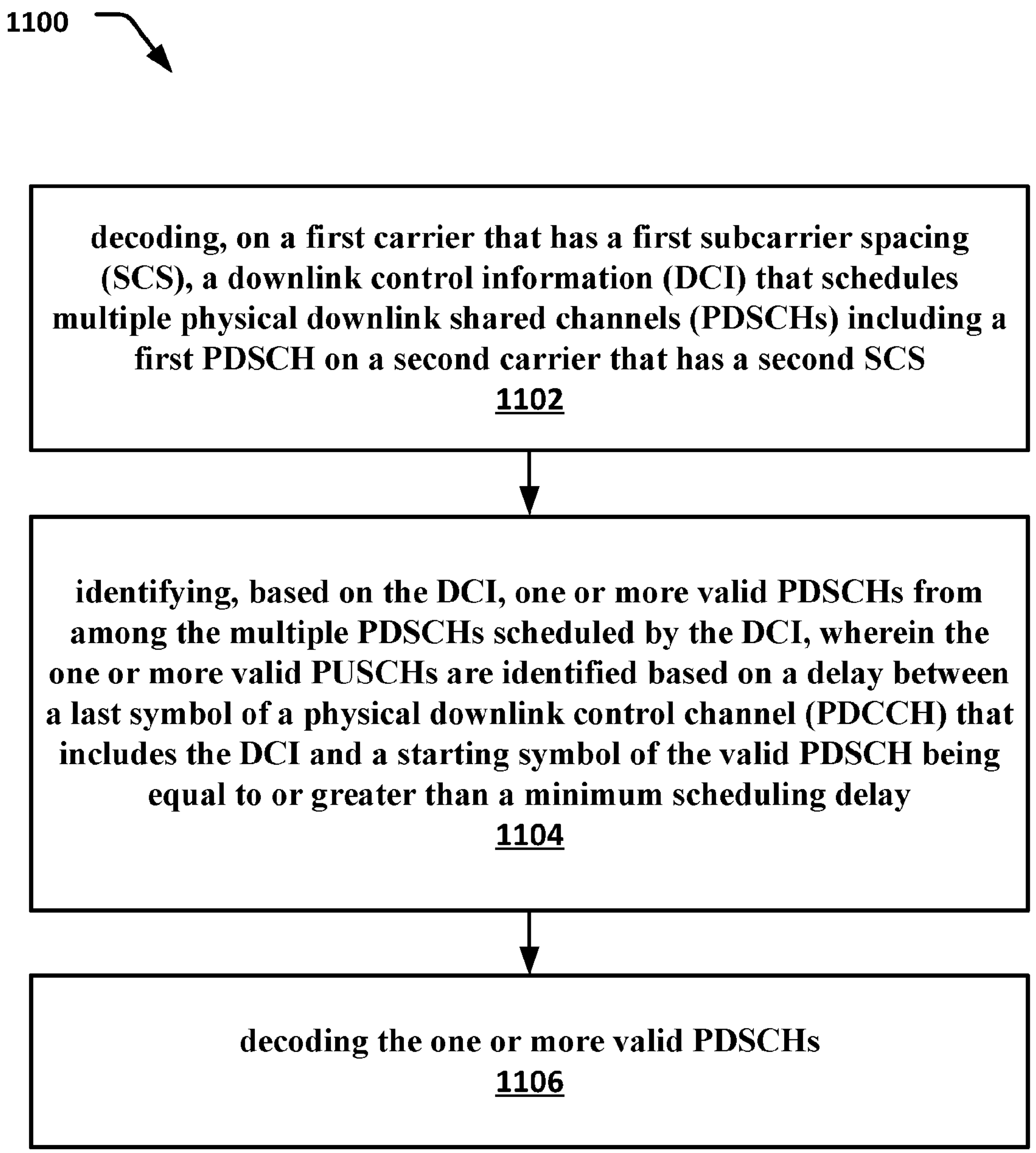

FIG. 11 illustrates another process 1100 in accordance with various embodiments. The process 1100 may be performed by a UE or a portion thereof. At 1102, the process 1100 may include decoding, on a first carrier that has a first subcarrier spacing (SCS), a downlink control information (DCI) that schedules multiple physical downlink shared channels (PDSCHs) including a first PDSCH on a second carrier that has a second SCS. At 1104, the process 1100 may further include identifying, based on the DCI, one or more valid PDSCHs from among the multiple PDSCHs scheduled by the DCI, wherein the one or more valid PUSCHs are identified based on a delay between a last symbol of a physical downlink control channel (PDCCH) that includes the DCI and a starting symbol of the valid PDSCH being equal to or greater than a minimum scheduling delay. At 1106, the process 1100 may further include decoding the one or more valid PDSCHs.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include one or more non-transitory computer-readable media (NTCRM) having instructions, stored thereon, that when executed by one or more processors of a user equipment (UE) configure the UE to: decode a downlink control information (DCI) that schedules multiple physical downlink shared channels (PDSCHs); determine a transmission configuration indicator (TCI) state for the PDSCHs based on a time domain resource allocation (TDRA) field in the DCI and one or more activated TCI states in an earliest slot in which one of the PDSCHs is scheduled; and receive the PDSCHs based on the determined TCI state.

Example 2 may include the one or more NTCRM of example 1, wherein the one or more activated TCI states are the same across slots for the PDSCHs.

Example 3 may include the one or more NTCRM of example 1, wherein the instructions, when executed, are further to configure the UE to receive a configuration of a PDSCH time domain allocation list for multi-PDSCH scheduling, wherein the TCI state is determined based on the PDSCH time domain allocation list.

Example 4 may include the one or more NTCRM of example 1, wherein the TCI state is determined based on a first SLIV of a row of a TDRA table indicated by the TDRA field.

Example 5 may include the one or more NTCRM of example 1, wherein the earliest slot in which the one of the PDSCHs is scheduled overlaps with an uplink (UL) symbol indicated by a time-domain duplexing (TDD) UL-downlink (DL) configuration.

Example 6 may include the one or more NTCRM of example 5, wherein the TDD UL-DL configuration is a common TDD UL-DL configuration or a dedicated TDD UL-DL configuration.

Example 7 may include the one or more NTCRM of example 1, wherein the instructions, when executed, are further to configure the UE to identify, based on the DCI, one or more valid PDSCHs and one or more invalid PDSCHs from among the multiple PDSCHs.

Example 8 may include the one or more NTCRM of example 7, wherein the PDSCHs are scheduled across different carriers with different subcarrier spacings, and wherein the one or more valid PDSCHs are determined based on a delay between an ending symbol of a physical downlink control channel (PDCCH) that includes the DCI and a starting symbol of a first valid PDSCH among the multiple PDSCHs that is no less than a minimum scheduling delay.

Example 9 may include one or more non-transitory computer-readable media (NTCRM) having instructions, stored thereon, that when executed by one or more processors of a user equipment (UE) configure the UE to: decode a downlink control information (DCI) that schedules multiple physical uplink shared channels (PUSCHs); identify, based on the DCI, one or more valid PUSCHs from among the multiple PUSCHs scheduled by the DCI, wherein the one or more valid PUSCHs are identified based on a delay between a last symbol of a physical downlink control channel (PDCCH) that includes the DCI and a starting symbol of the valid PUSCH among the multiple PUSCHs, wherein the delay is based on a PUSCH preparation time and a timing advance; and encode the one or more valid PUSCHs for transmission.

Example 10 may include the one or more NTCRM of example 9, wherein the validity of the one or more valid PUSCHs is checked after an initial determination that the one or more valid PUSCHs are not overlapped with a downlink symbol indicated by a time domain duplexing (TDD) uplink-downlink (UL-DL) configuration or with a symbol configured for transmission of a synchronization signal (SS)/physical broadcast channel (PBCH).

Example 11 may include the one or more NTCRM of example 9, wherein one or more of the valid PUSCHs overlaps with a downlink symbol of a time domain duplexing (TDD) uplink-downlink (UL-DL) configuration.

Example 12 may include the one or more NTCRM of example 9, wherein the one or more valid PUSCHs are identified based on meeting a condition that a first uplink symbol in a resource allocation for the PUSCH, including the effect of the timing advance, is no earlier than at a symbol $L_2$, where $L_2$ is defined as a next uplink symbol with a cyclic prefix starting at a time $T_{proc,2}=\max((N_2+d_{2,1}+d_2)(2048+144)\cdot\kappa 2^{-\mu}\cdot T_C+T_{ext}+T_{switch}, d_{2,2})$ after an end of the reception of the last symbol of a PDCCH that carries the DCI.

Example 13 may include the one or more NTCRM of example 12, wherein the resource allocation is identified including a demodulation reference signal (DM-RS), and based on a first slot offset value, $K_2$, a second slot offset value, $K_{offset}$, and a start S and a length L of the resource allocation indicated by a time domain resource assignment in the DCI.

Example 14 may include the one or more NTCRM of any one of examples 9-13, wherein the PDCCH is received in PDCCH candidates associated with a search space set configured with search space linking, and wherein the last symbol of the PDCCH corresponds to a first PDCCH candidate, of the PDCCH candidates, that is latest in time.

Example 15 may include one or more non-transitory computer-readable media (NTCRM) having instructions, stored thereon, that when executed by one or more processors of a user equipment (UE) configure the UE to: decode, on a first carrier that has a first subcarrier spacing (SCS), a downlink control information (DCI) that schedules multiple physical downlink shared channels (PDSCHs) including a first PDSCH on a second carrier that has a second SCS; identify, based on the DCI, one or more valid PDSCHs from among the multiple PDSCHs scheduled by the DCI, wherein the one or more valid PUSCHs are identified based on a delay between a last symbol of a physical downlink control channel (PDCCH) that includes the DCI and a starting symbol of the valid PDSCH being equal to or greater than a minimum scheduling delay; and decode the one or more valid PDSCHs.

Example 16 may include the one or more NTCRM of example 15, wherein the validity of the one or more valid PDSCHs is checked after an initial determination that the one or more valid PDSCHs are not overlapped with an uplink symbol indicated by a time domain duplexing (TDD) uplink-downlink (UL-DL) configuration.

Example 17 may include the one or more NTCRM of example 15, wherein, if the first SCS is less than the second SCS, the minimum scheduling delay corresponds to a first symbol of a resource allocation for the PDSCH, including a demodulation reference signal (DM-RS), starting no earlier than a first symbol of a slot starting at least a number, $N_{pdsch}$, of PDCCH symbols after the last symbol of the PDCCH, wherein the number, $N_{pdsch}$, is based on the first subcarrier spacing.

Example 18 may include the one or more NTCRM of example 15, wherein, if the first SCS is greater than the second SCS, the minimum scheduling delay corresponds to a first symbol of a resource allocation for the PDSCH, including a demodulation reference signal (DM-RS), starting no earlier than a number, $N_{pdsch}$, of PDCCH symbols after the last symbol of the PDCCH, wherein the number, $N_{pdsch}$, is based on the first subcarrier spacing.

Example 19 may include the one or more NTCRM of example 17 or 18, wherein the resource allocation for the PDSCH is identified based on a slot offset $K_0$ and a start and length indicator value (SLIV) indicated by the DCI.

Example 20 may include the one or more NTCRM of any one of examples 15-19, wherein the delay is determined without taking into account a receive timing difference between a first cell associated with the first carrier and a second cell associated with the second carrier.

Example 21 may include the one or more NTCRM of any one of examples 15-20, wherein the PDCCH is received in PDCCH candidates associated with a search space set configured with search space linking, and wherein the last symbol of the PDCCH corresponds to a first PDCCH candidate, of the PDCCH candidates, that is latest in time.

Example 22 may include a method of wireless communication for multiple PDSCH or PUSCH transmissions, the method including: receiving, by UE, the high layer configuration on multi-PDSCH or multi-PUSCH scheduling and the TDD UL-DL configurations; determining by UE, a DCI that schedules multiple PDSCHs or PUSCHs; and processing, by UE, the valid scheduled PDSCHs or PUSCHs.

Example 23 may include the method of example 22 or some other example herein, wherein the delay between the ending symbol of a PDCCH and start symbol of the valid PUSCH among the multiple PUSCHs scheduled by the PDCCH is no less than the PUSCH preparation time, after taking into account the effect of the timing advance.

Example 24 may include the method of example 22 or some other example herein, wherein for cross-carrier scheduling with different SCS, the delay between the ending symbol of a PDCCH and the start symbol of the first valid PDSCH among the multiple PUSCHs scheduled by the PDCCH is no less than a minimum scheduling delay.

Example 25 may include the method of example 22 or some other example herein, when the UE is configured with a multi-PDSCH transmission, the indicated TCI state is based on the activated TCI states in the first slot with the valid scheduled PDSCH, and UE expects the activated TCI states are the same across the slots with the scheduled PDSCH.

Example 26 may include a method of a UE, the method comprising: receiving configuration information for multi-PDSCH or multi-PUSCH scheduling and TDD UL-DL configurations; decoding a DCI that schedules multiple PDSCHs or PUSCHs; and determining, based on the DCI, one or more valid PDSCHs or PUSCHs from among the multiple PDSCHs or PUSCHs scheduled by the DCI.

Example 27 may include the method of example 26 or some other example herein, wherein the one or more valid PUSCHs are determined based on a delay between an ending symbol of a PDCCH that includes the DCI and starting symbol of the valid PUSCH among the multiple PUSCHs scheduled by the PDCCH, wherein the delay is based on a PUSCH preparation time and a timing advance.

Example 28 may include the method of example 26 or some other example herein, wherein for cross-carrier scheduling with different SCS, the one or more valid PDSCHs are determined based on a delay between an ending symbol of a PDCCH that includes the DCI and a starting symbol of a first valid PDSCH among the multiple PDSCHs scheduled by the PDCCH that is no less than a minimum scheduling delay.

Example 29 may include the method of example 26 or some other example herein, wherein an indicated TCI state for multi-PDSCH transmission is based on one or more activated TCI states in a first slot with the valid PDSCH.

Example 30 may include the method of example 29 or some other example herein, wherein the one or more activated TCI states are the same across slots with the valid PDSCH.

Example Z01 may include an apparatus comprising means to perform one or more elements of a method described in or related to any of examples 1-30, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-30, or any other method or process described herein.

Example Z03 may include an apparatus comprising logic, modules, or circuitry to perform one or more elements of a method described in or related to any of examples 1-30, or any other method or process described herein.

Example Z04 may include a method, technique, or process as described in or related to any of examples 1-30, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-30, or portions thereof.

Example Z06 may include a signal as described in or related to any of examples 1-30, or portions or parts thereof.

Example Z07 may include a datagram, packet, frame, segment, protocol data unit (PDU), or message as described in or related to any of examples 1-30, or portions or parts thereof, or otherwise described in the present disclosure.

Example Z08 may include a signal encoded with data as described in or related to any of examples 1-30, or portions or parts thereof, or otherwise described in the present disclosure.

Example Z09 may include a signal encoded with a datagram, packet, frame, segment, protocol data unit (PDU), or message as described in or related to any of examples 1-30, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-30, or portions thereof.

Example Z11 may include a computer program comprising instructions, wherein execution of the program by a processing element is to cause the processing element to carry out the method, techniques, or process as described in or related to any of examples 1-30, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

ABBREVIATIONS

Unless used differently herein, terms, definitions, and abbreviations may be consistent with terms, definitions, and abbreviations defined in 3GPP TR 21.905 v16.0.0 (2019 May). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| AC | Application Client |
| ACR | Application Context Relocation |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CDR | Charging Data Request |
| CDR | Charging Data Response |
| CFRA | Contention Free Random Access |
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |

-continued

| | |
|---|---|
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSCF | call session control function |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell- specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| EAS | Edge Application Server |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |

-continued

| | |
|---|---|
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |

-continued

| | |
|---|---|
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IIOT | Industrial Internet of Things |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LMF | Location Management Function |
| LOS | Line of Sight |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |

-continued

| | |
|---|---|
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non- Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |

-continued

| | |
|---|---|
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |

-continued

| | |
|---|---|
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDT | Small Data Transmission |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |

-continued

| | |
|---|---|
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH Block SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |

-continued

| | |
|---|---|
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, VLAN Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over- Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

TERMINOLOGY

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-Measurement TimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. An apparatus for use in a user equipment (UE), wherein the apparatus comprises:
- memory to store a received downlink control information (DCI) that schedules a plurality of physical downlink shared channels (PDSCHs); and
- one or more processors configured to:
  - receive a configuration for multi-PDSCH scheduling;
  - determine a transmission configuration indicator (TCI) state related to the plurality of PDSCHs based on the DCI and the configuration for multi-PDSCH scheduling, wherein the determined TCI state is the same across slots on which the plurality of PDSCHs are transmitted; and
  - identify the plurality of PDSCHs based on the determined TCI state, wherein the one or more processors are further to identify the TCI state related to the plurality of PDSCHs based on a time domain resource allocation (TDRA) field in the DCI.

2. The apparatus of claim 1, wherein the PDSCH is an earliest PDSCH of the plurality of PDSCHs.

3. The apparatus of claim 1, wherein the TCI state related to the plurality of PDSCHs is determined based on a PDSCH time domain allocation list for multi-PDSCH scheduling.

4. The apparatus of claim 1, wherein the TCI state related to the plurality of PDSCHs is determined based on a first start and length indicator value (SLIV) of a row of a TDRA table indicated by the TDRA field.

5. The apparatus of claim 1, wherein the one or more processors are further to identify, based on the DCI, one or more valid PDSCHs and one or more invalid PDSCHs from among the plurality of PDSCHs.

6. One or more non-transitory computer-readable media (NTCRM) comprising instructions that, upon execution of the instructions by the one or more processors, are to cause a user equipment (UE) to:
- receive a configuration for multi-PDSCH scheduling;
- identify a received downlink control information (DCI) that schedules a plurality of physical downlink shared channels (PDSCHs);
- determine a transmission configuration indicator (TCI) state related to the plurality of PDSCHs based on the DCI and the configuration for multi-PDSCH scheduling, wherein the determined TCI state is the same across slots on which the plurality of PDSCHs are transmitted; and
- identify the plurality of PDSCHs based on the determined TCI state, wherein the instructions are further to cause the UE to identify the TCI state related to the plurality of PDSCHs based on a time domain resource allocation (TDRA) field in the DCI.

7. The one or more NTCRM of claim 6, wherein the PDSCH is an earliest PDSCH of the plurality of PDSCHs.

8. The one or more NTCRM of claim 6, wherein the TCI state related to the plurality of PDSCHs is determined based on a PDSCH time domain allocation list for multi-PDSCH scheduling.

9. The one or more NTCRM claim 6, wherein the TCI state related to the plurality of PDSCHs is determined based on a first start and length indicator value (SLIV) of a row of a TDRA table indicated by the TDRA field.

10. The one or more NTCRM of claim 6, wherein the instructions are further to cause the UE to identify, based on the DCI, one or more valid PDSCHs and one or more invalid PDSCHs from among the plurality of PDSCHs.

11. One or more non-transitory computer-readable media (NTCRM) comprising instructions that, upon execution of the instructions by the one or more processors, are to cause a base station to:

transmit a configuration for multi-PDSCH scheduling;

transmit, to a user equipment (UE), a downlink control information (DCI) that schedules a plurality of physical downlink shared channels (PDSCHs);

determine a transmission configuration indicator (TCI) state related to the plurality of PDSCHs based on the DCI and the configuration for multi-PDSCH scheduling, wherein the determined TCI state is the same across slots on which the plurality of PDSCHs are transmitted; and transmit the plurality of PDSCHs based on the determined TCI state, wherein the instructions are further to cause the base station to identify the TCI state related to the plurality of PDSCHs based on a time domain resource allocation (TDRA) field in the DCI.

12. The one or more NTCRM of claim 11, wherein the PDSCH is an earliest PDSCH of the plurality of PDSCHs.

13. The one or more NTCRM of claim 11, wherein the TCI state related to the plurality of PDSCHs is determined based on a PDSCH time domain allocation list for multi-PDSCH scheduling.

14. The one or more NTCRM of claim 11, wherein the instructions are further to cause the UE to identify, based on the DCI, one or more valid PDSCHs and one or more invalid PDSCHs from among the plurality of PDSCHs.

* * * * *